(12) United States Patent
Huang et al.

(10) Patent No.: US 8,333,070 B2
(45) Date of Patent: Dec. 18, 2012

(54) MECHANICAL ENERGY STORAGE METHOD AND DEVICE

(76) Inventors: Henry C. Huang, Cambridge, MA (US); Jane Huang, Cambridge, MA (US)

( * ) Notice: Subject to any disclaimer, the term of this patent is extended or adjusted under 35 U.S.C. 154(b) by 0 days.

(21) Appl. No.: 13/100,492

(22) Filed: May 4, 2011

(65) Prior Publication Data

US 2012/0280515 A1 Nov. 8, 2012

(51) Int. Cl.
F03B 13/18 (2006.01)
F03B 17/02 (2006.01)
(52) U.S. Cl. ................ 60/497; 60/495; 60/507
(58) Field of Classification Search ............ 60/372, 60/398, 474, 495, 497, 639, 640, 675, 618, 60/620; 290/1 R, 53–55, 1 C
See application file for complete search history.

(56) References Cited

U.S. PATENT DOCUMENTS

| | | | |
|---|---|---|---|
| 328,418 A | 10/1885 | Main | |
| 3,487,228 A | 12/1969 | Kriegel | |
| 3,668,412 A * | 6/1972 | Vrana et al. | 290/53 |
| 4,076,463 A | 2/1978 | Welczer | |
| 4,208,878 A | 6/1980 | Rainey | |
| 4,248,044 A | 2/1981 | Woodilla | |
| 4,472,937 A | 9/1984 | Isamu | |
| 4,539,484 A * | 9/1985 | Suggs | 290/53 |
| 4,671,742 A | 6/1987 | Gyimesi | |
| 4,850,190 A | 7/1989 | Pitts | |
| 5,066,867 A | 11/1991 | Shim | |
| 5,086,664 A | 2/1992 | Wagner | |
| 5,094,595 A | 3/1992 | Labrador | |
| 5,424,582 A | 6/1995 | Trepl, II et al. | |
| 5,889,336 A | 3/1999 | Tateishi | |
| 5,929,531 A | 7/1999 | Lagno | |
| 6,269,636 B1 | 8/2001 | Hatzilakos | |
| 6,389,810 B1 | 5/2002 | Nakomcic | |
| 6,574,957 B2 | 6/2003 | Brumfield | |
| 6,647,328 B2 | 11/2003 | Walker | |
| 6,647,716 B2 | 11/2003 | Boyd | |
| 6,803,670 B2 * | 10/2004 | Peloquin | 290/53 |
| 2007/0102937 A1 | 5/2007 | Resen Steenstrup et al. | |
| 2008/0001132 A1 * | 1/2008 | Huang | 254/362 |
| 2008/0053084 A1 | 3/2008 | Stansby et al. | |
| 2008/0157532 A1 | 7/2008 | Loui et al. | |
| 2008/0169653 A1 | 7/2008 | Olson | |
| 2009/0165455 A1 | 7/2009 | Gilboa | |
| 2009/0193808 A1 * | 8/2009 | Fiske | 60/721 |

* cited by examiner

*Primary Examiner* — Kenneth Bomberg
*Assistant Examiner* — Christopher Jetton
(74) *Attorney, Agent, or Firm* — Duane Morris LLP

(57) ABSTRACT

Provided is an energy storage system configured to accumulate energy for subsequent discharge. One embodiment includes an indirect energy storage assembly configured to accept energy input from a direct storage assembly. The indirect energy storage assembly includes a converter for lifting a mass, a speed reducer coupled to the converter for increasing torque provided, and a mass coupled to the speed reducer for generating potential energy when raised. In one embodiment, the direct energy storage assembly produces energy based on descent of a mass, the descent controlled by operation of a speed increaser coupled to a generator. In one example, the speed increaser provides an input:output ratio of at least 1:100. The speed increaser can be configured based on parameters of the generator (e.g., speed and torque). The mass of the direct energy storage assembly can include a float for lifting the mass responsive to water level.

30 Claims, 16 Drawing Sheets

MECHANICAL ENERGY STORAGE METHOD AND DEVICE

BACKGROUND OF THE DISCLOSURE

Significant activity has taken place in the field of energy generation, providing newer more efficient and cleaner sources of power. Conventional technologies are directed to harnessing various clean energy sources. Currently, attempts to capture energy from various clean sources (e.g., water, wind, and solar) are varied and far-reaching.

Generally, energy sources can be divided into two categories: limited and unlimited. The limited sources, e.g., crude oil, natural gas, and coal, provide a great amount of output, and can be stored and transported conveniently with current infrastructure. For example, gasoline by itself is a good energy source and easily stored. This is in large part because of the infrastructure that has developed to refine and transport gasoline, which is a relatively compact liquid energy source. These limited sources, however, present many problems. One of the main problems is the environmental impact caused by excessive consumption of these limited sources of energy. Presently, it is thought that consumption of these resources causes global warming, air pollution, noise and soil pollution. Of even greater concern is the limited amount of these resources. Various estimates have been made to determine when these energy resources will be finally depleted.

Unlimited sources of energy may include, for example, solar, wind, wave, and tidal power. These sources are abundant, will never run out, and may be harnessed with minimal environmental damage. Notwithstanding, there are a number of difficulties presented in capturing energy from these unlimited sources. For example, solar energy production requires consistently available sunlight. Wind farms require a consistent wind source. Simply put, unlimited energy sources are vulnerable to changing environmental conditions.

Conventional approaches to providing energy through either type of source (limited and unlimited) typically approach the problem from the perspective of energy generation, and often fails to address the problem of storing any produced energy.

The concept of generating potential energy by lifting objects is well known in the field of energy generation and storage. However, the typical release of such potential energy is unsuitable for commercial use of power. An object falling under the influence of gravity falls far too quickly to produce sustainable levels of energy needed for every day use.

Other systems for storing energy have not been widely implemented. Springs, for example, are also well known for their ability to store energy, but implementing spring driven systems to provide commercially viable energy supplies have been largely unsuccessful. Flywheel systems have been implemented to store vast amounts of energy for use in high speed discharges. However, the expense and complexity of such flywheel systems have limited their implementations to specialized projects. Chemical based systems are under development, but again have not been widely implemented. Other systems and methods have faired a little better in establishing commercially successful operation.

SUMMARY OF THE DISCLOSURE

It is realized that there are a number of issues to address in any system configured to produce and store energy. A well-known concept is that lifting an object spends energy that can be re-used or re-directed when the object falls. Many devices implement some form of this principle to harness energy.

Lifting and dropping objects, weights or fluids from a height releases stored energy. However, the rapid release of energy from a falling object is generally unsuitable to any known or viable commercial energy application. It is realized that if falling objects can be controlled to generate commercially usable energy, efficient energy storage mechanisms can be achieved. Coupling efficient energy storage systems with unlimited energy sources (solar, wind, water, etc.) may result in commercially viable and industrial usable energy generation and storage mechanisms. Further, it is realized that even the most incremental energy generation process can be useful if the small amounts of energy can be stored and accumulated into commercially usable discharges.

These efficient energy storage mechanisms resolve some of the problems associated with unlimited energy sources, making them less vulnerable to changing environmental conditions, and improving the applicability and sustainability of the energy generation systems that convert the limited energy sources. According to one aspect, provided is a mechanical energy storage device that operates using the principles of lifting an energy storing mass in a fashion similar to a crane lifting a heavy object. A large weight is used as the mass, and is lifted slowly from ground zero (zero potential energy) to a certain height (positive potential energy), thus creating stored energy. When the weight is released under proper control, the gravitational force pulling down on the mass causes the system to produce energy by rotating a generator. Controlling the fall so that the discharge produced occurs over long periods of time results in efficient and usable energy storage and discharge.

According to one aspect of the present disclosure, an energy storage system configured to accumulate energy for discharge is provided. The energy storage system comprises an indirect energy storage assembly configured to accept energy input, the indirect energy storage assembly comprising a converter configured to provide an output rotation upon input of energy from an energy source, a speed reducer coupled to the converter, wherein the speed reducer is configured to accept an input rotation from the converter and provide a reduced output, and a mass coupled to the speed reducer, wherein the mass is configured to generate potential energy when raised by the reduced output rotation of the speed reducer, wherein the indirect energy storage assembly is further configured to provide energy discharge in response to descent of the mass, and at least one direct energy storage assembly configured to produce energy input into the indirect storage assembly, the direct storage assembly comprising a mass, a speed increaser coupled to the mass, wherein the mass upon descent is configured to provide an input rotation to the speed increaser, and wherein the speed increaser is configured to produce from the input rotation a reduced torque output rotation, and a generator coupled to the speed increaser, wherein the generator is configured to produce energy in response to the reduced torque output rotation provided. According to one embodiment of the present disclosure, the speed reducer is further configured to provide the reduced rotation output at a ratio of at least one hundred to one. According to another embodiment of the disclosure, the speed reducer is further configured to increase a torque of the reduced rotation output relative to the input rotation.

According to one embodiment of the disclosure, the indirect energy storage assembly further comprises a speed increaser coupled to the mass, wherein the mass upon descent is configured to provide an input rotation to the speed increaser, wherein the speed increaser is configured to produce from the input rotation a reduced torque output rotation, and a generator, coupled to the speed increaser, wherein the generator is configured to produce energy in response to the reduced torque output rotation provided. According to another embodiment of the disclosure, the speed increaser of the indirect energy storage assembly is further configured to provide an input to output ratio of at least one to one hundred. According to another embodiment of the disclosure, the mass of the indirect energy storage assembly is configured to have a maximum height and at least the speed increaser of the indirect energy storage system is configured to control a rate of descent of the mass to achieve a total descent time. According to another embodiment of the disclosure, the total descent time is at least one hour. According to another embodiment of the disclosure, at least the speed increaser and the generator of the indirect energy storage assembly are configured to control the rate of descent.

According to one embodiment of the present disclosure, the indirect energy storage assembly further comprises a first clutch configured to engage and disengage the mass from the speed increaser. According to another embodiment of the disclosure, the indirect energy storage assembly further comprises a second clutch configured to engage and disengage the mass from the converter. According to another embodiment of the disclosure, the indirect energy storage assembly further comprises a locking mechanism configured to prevent the mass from descending while engaged, and wherein the locking mechanism is further configured to permit lift of the mass by the reduced rotation output of the speed reducer when engaged. According to another embodiment of the disclosure, the speed increaser of the direct energy storage assembly is further configured to provide an input to output ratio of at least one to one hundred. According to another embodiment of the disclosure, the mass of the direct energy storage assembly is configured to have a maximum height and at least the speed increaser of the direct energy storage system is configured to control a rate of descent of the mass to achieve a total descent time.

According to one embodiment of the present disclosure, the total descent time is at least one hour. According to another embodiment of the disclosure, the direct energy storage assembly further comprises a means for lifting the mass, wherein the means is configured to lift the mass to a raised position with high potential energy from an at rest position with little or no potential energy. According to another embodiment of the disclosure, the at least one direct energy storage assembly further comprises a fluid chamber. According to another embodiment of the disclosure, the fluid chamber is configured to provide a fluid level to the means for lifting, and the means for lifting is further configured to lift the mass in response to increases in the fluid level. According to another embodiment of the disclosure, the energy storage system further comprises an outlet configured to permit discharge of fluid from the fluid chamber. According to another embodiment of the disclosure, the outlet is connected to at least one of a second direct storage assembly and a turbine configured to produce energy to input to the indirect energy storage assembly. According to another embodiment of the disclosure, the energy storage system further comprises a natural source of fluid. According to another embodiment of the disclosure, the natural source of fluid includes at least one of a pond, river, lake, estuary, tidal body of water, runoff, flood water, and precipitation. According to another embodiment of the disclosure, the direct energy storage assembly further comprises a locking mechanism configured to prevent the mass from descending while engaged, and wherein the locking mechanism is further configured to permit lift of the mass when engaged.

According to one embodiment of the disclosure, an indirect energy storage system configured to accept energy input is provided. The indirect energy storage assembly comprises a converter configured to provide an output rotation upon input of energy from an energy source, a speed reducer coupled to the converter, wherein the speed reducer is configured to accept an input rotation from the converter and provide a reduced rotation output at a ratio of at least one hundred to one, and a mass coupled to the speed reducer, wherein the mass is configured to generate potential energy when raised by the reduced rotation output of the speed reducer, wherein the indirect energy storage system is further configured to provide energy discharge in response to descent of the mass. According to another embodiment of the disclosure, the speed reducer is further configured to increase a torque of the reduced rotation output relative to the input rotation. According to another embodiment of the disclosure, the indirect energy storage system further comprises a speed increaser coupled to the mass, wherein the mass upon descent is configured to provide an input rotation to the speed increaser, wherein the speed increaser is configured to produce from the input rotation a reduced torque output rotation, and a generator, coupled to the speed increaser, wherein the generator is configured to produce energy in response to the reduced torque output rotation provided. According to another embodiment of the disclosure, the speed increaser of the indirect energy storage assembly is further configured to provide an input to output ratio of at least one to one hundred.

According to one embodiment of the disclosure, the mass is configured to have a maximum height and at least the speed increaser is configured to control a rate of descent of the mass. According to another embodiment of the disclosure, the indirect energy storage system produces energy only in response to descent of the mass.

According to one aspect of the present disclosure, an indirect energy storage system configured to accept energy input is provided. The indirect energy storage assembly comprises a first converter configured to provide an output rotation upon input of energy from an energy source, a first speed reducer coupled to the first converter, wherein the first speed reducer is configured to accept an input rotation from the first converter and provide an increased torque output rotation, a first mass coupled to the first speed reducer, wherein the first mass is configured to generate potential energy when raised by the increased torque output rotation of the first speed reducer, wherein the indirect energy storage system is further configured to provide energy discharge in response to descent of the first mass, a second converter configured to provide an output rotation upon input of energy from an energy source, a second speed reducer coupled to the second converter, wherein the second speed reducer is configured to accept an input rotation from the second converter and provide an increased torque output rotation, and a second mass coupled to the second speed reducer, wherein the second mass is configured to generate potential energy when raised by the reduced speed increased torque output rotation of the second speed reducer, wherein the indirect energy storage system is further configured to provide energy discharge in response to descent of the second mass.

According to one embodiment of the present disclosure, the first speed reducer is further configured to reduce a speed of the increased torque output rotation relative to the input rotation. According to another embodiment of the disclosure, the second speed reducer is further configured to reduce a speed of the increased torque output rotation relative to the input rotation. According to another embodiment of the disclosure, the indirect energy storage system further comprises a first speed increaser coupled to the first mass, wherein the first mass upon descent is configured to provide an input rotation to the first speed increaser, wherein the first speed increaser is configured to produce from the input rotation a reduced torque output rotation, and a generator, coupled to the first speed increaser, wherein the generator is configured to produce energy in response to the reduced torque output rotation provided. According to another embodiment of the disclosure, the indirect energy storage system further comprises a second speed increaser coupled to the second mass, wherein the second mass upon descent is configured to provide an input rotation to the second speed increaser, wherein the second speed increaser is configured to produce from the input rotation a reduced torque output rotation, and the generator, coupled to the second speed increaser, wherein the generator is configured to produce energy in response to the reduced torque output rotation provided.

According to one embodiment of the present disclosure, the first speed increaser of the indirect energy storage assembly is further configured to provide an input to output ratio of at least one to one hundred. According to another embodiment of the disclosure, the second speed increaser of the indirect energy storage assembly is further configured to provide an input to output ratio of at least one to one hundred. According to another embodiment of the disclosure, the first and second mass are configured to have a maximum height and at least the respective first and second speed increasers are configured to control a rate of descent of the mass. According to another embodiment of the disclosure, the indirect energy storage system produces energy only in response to descent of one of the first and second masses.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION OF THE DISCLOSURE

According to one aspect of the disclosure, energy storage systems that are configured to discharge over long periods of time can incorporate falling weights to achieve commercially viable energy sources. Further configuring the systems to provide a usable range of motion for the falling weights constrained by small distances ensures the usability of any energy storage systems under real world conditions. Under traditional applications, lifting an object higher results in greater potential energy. However, the ability to lift objects to greater and greater distances is necessarily constrained by physical limitations. Thus, effective energy storage systems must be able to sustain long discharge times and be physically realizable. In other words, the falling weights typically cannot move great distances.

Balancing the concerns of usable discharge time constrained by small distances has rendered previous energy storage/generation systems unusable in most settings. It is realized by combining massive weights, very large mechanical ratios, and establishing a balance between the weights and the ratios, an energy storage system can be configured to have long discharge times—hours, days and even years—while still constraining the system to physically realizable distances of motion.

In some settings, the physically realizable distance of motion may include the height of high structures, such as skyscrapers. However, reasonable constraints establish maximum thresholds beyond which lifting objects to store energy is not feasible. Thus, lifting distance becomes a constraining factor when addressing issues associated with usable energy storage.

Circulatory Storage and Generation

Figure 1A:
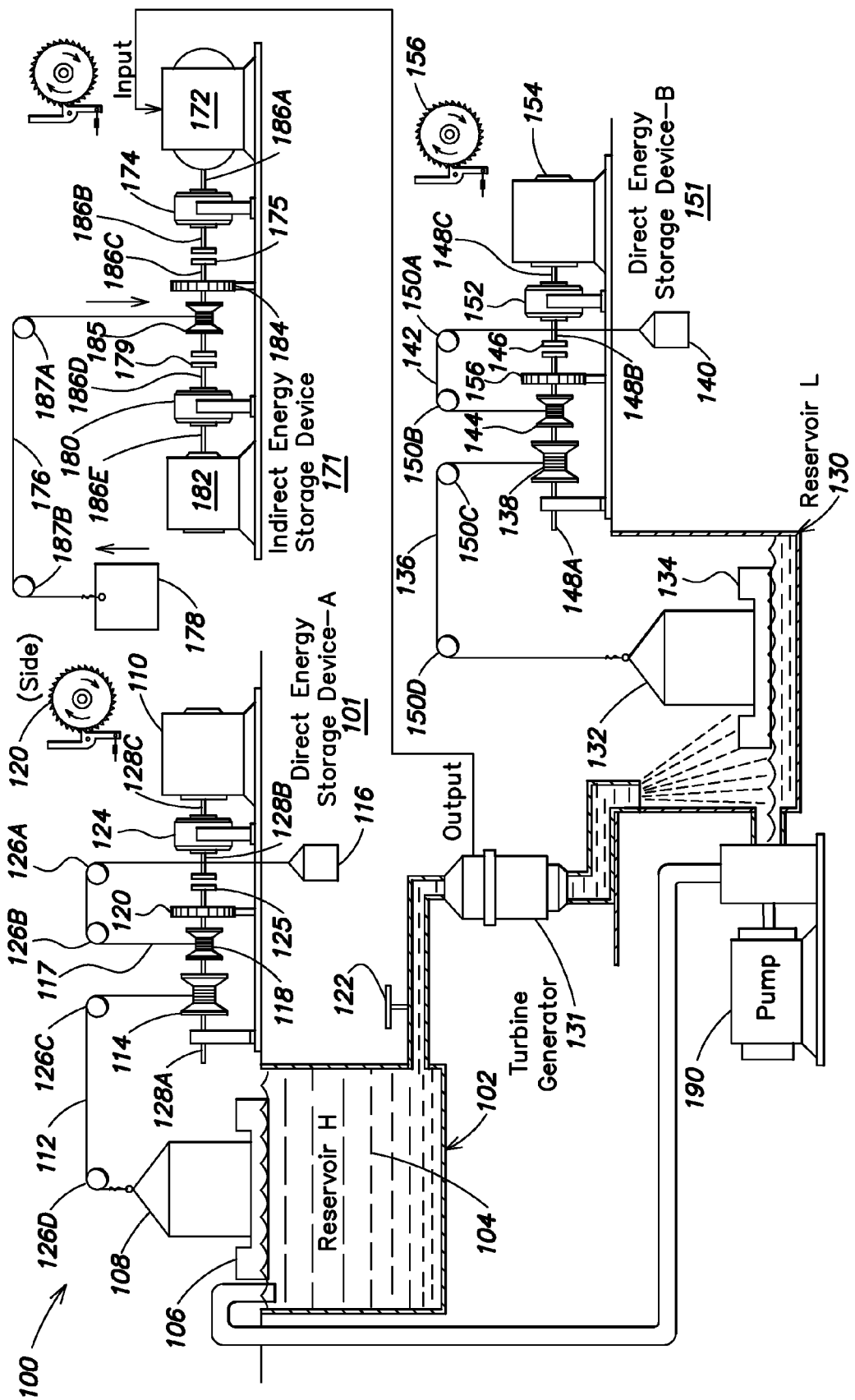
FIGS. 1A-E are functional block diagrams illustrating examples of operation of an energy storage system incorporating various aspects of the present the disclosure.

With reference to FIG. 1A, shown is an example system 100 implementing direct energy storage mechanisms 101 and 151 and indirect energy storage mechanism 171 according to various aspects of the present disclosure. Direct energy storage mechanisms can be broadly considered "direct" due to their ability to capture the energy provided by a lifted weight directly. In the direct energy storage system, a mass 108 is coupled to a float 106. The mass 108 is lifted to height based on a fluid level (e.g., water) in chamber 102. Upon removal or descent of the water, mass 108 can drop resulting in the operation of a generator 110 through a speed increaser 124 which accepts an input rotation at a number of rotations per minute produced through the descent of the mass 108 and produces an output rotation of increased rpm and reduced torque to the generator to produce energy. Indirect energy storage mechanisms receive input of energy from another source (e.g., direct energy mechanism 101) and convert the input energy into stored potential energy. The energy is stored by lifting a storage element (e.g., mass 178) to a height through operation of a speed reducer 174 which accepts an input rotation produce through operation of converter 172 at a number of rotations per minute and produces an output rotation of decreased rpm and increased torque for lifting the mass 178. In the example system 100, multiple energy sources provide the input to indirect energy storage mechanism 171 depending on a phase of operation. In the first phase, shown in FIG. 1A, water flow turns a turbine generator 131. The energy output from turbine 131 is supplied to a converter 172 associated with the indirect storage mechanism 171. Converter 172 converts input energy into rotational force that is applied to lift the mass 178 to a height. Energy is stored in indirect energy storage mechanism 171 by maintaining mass 178 at height until such time as power output may be needed.

Figure 1B:
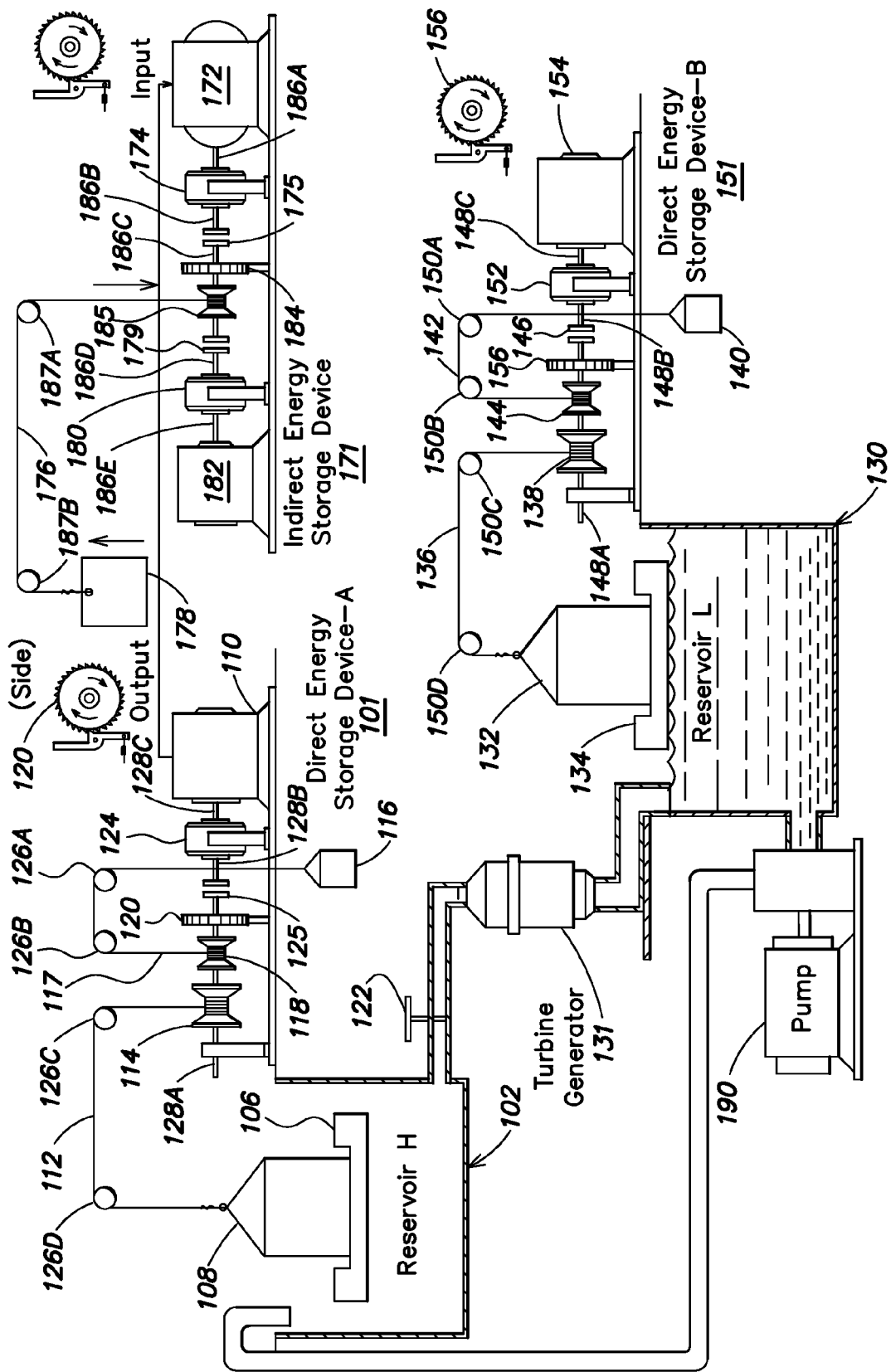
Figure 1C:
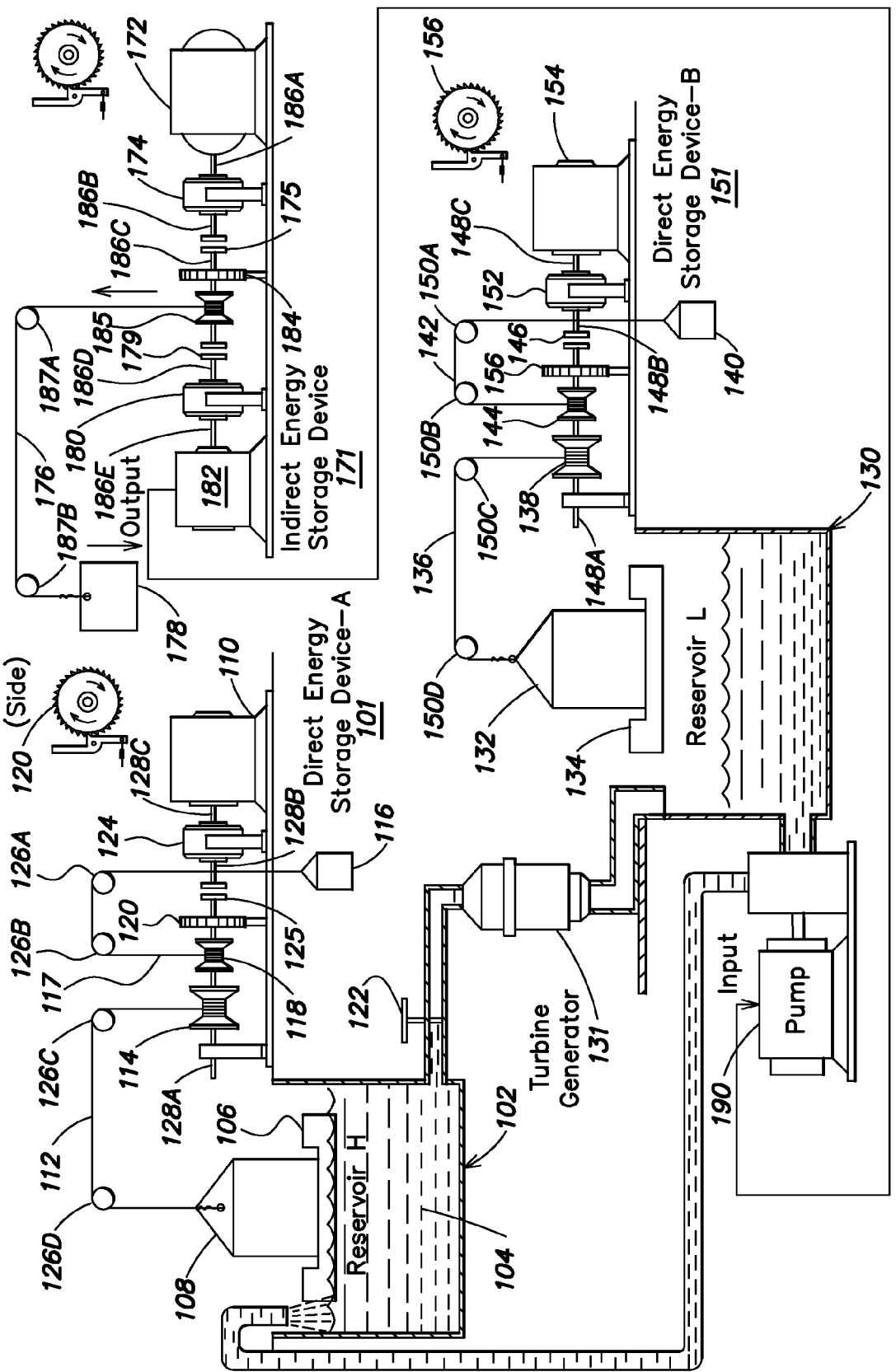
Figure 1D:
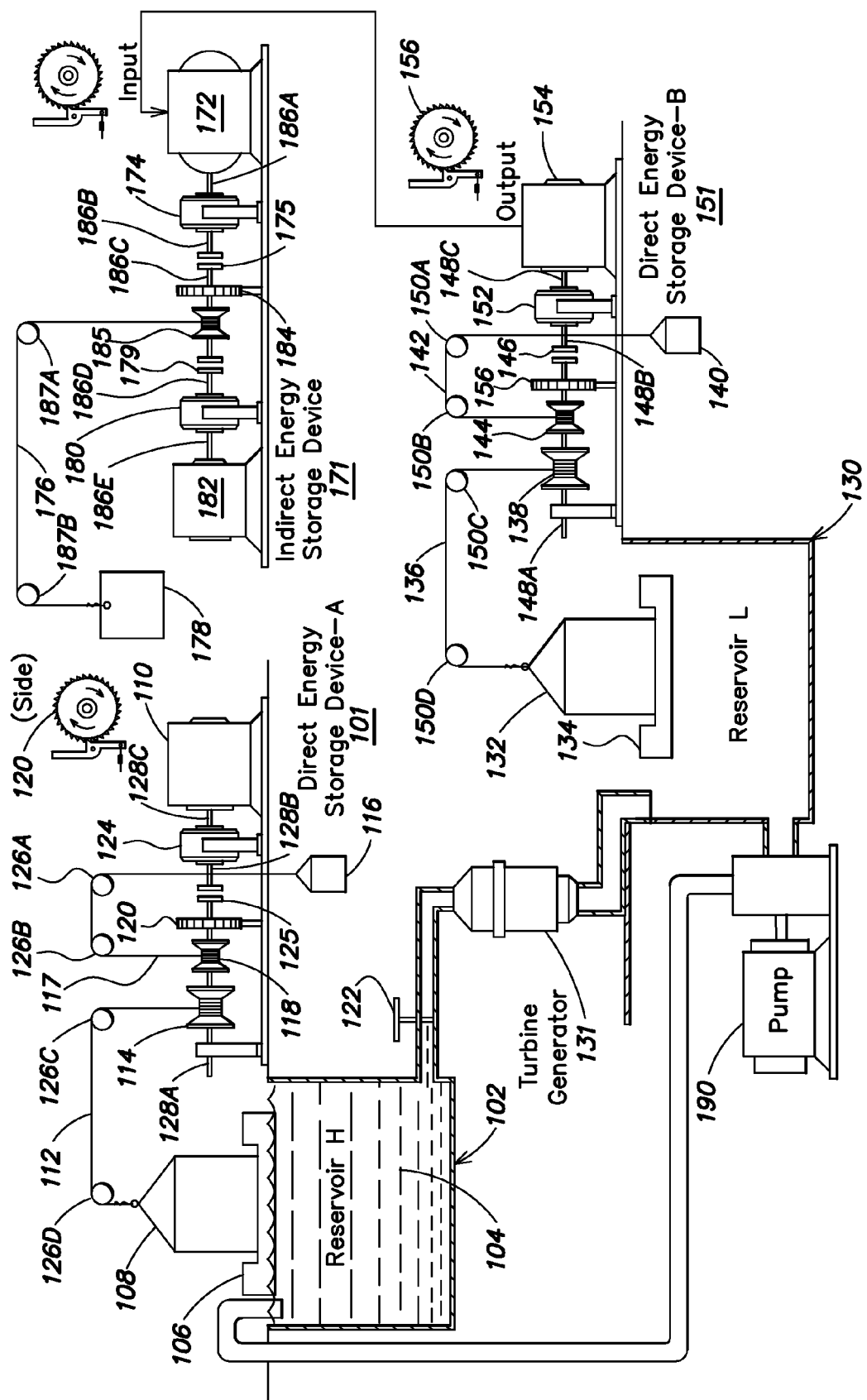

FIG. 1B illustrates a second phase of operation of the system 100. As shown direct energy storage mechanism 101 provides its energy output produced by the descent of mass 108 to indirect energy storage mechanism 171. In FIG. 1C, a third phase of operation is shown, in which indirect energy storage system 171 supplies power produced through operation of a generator 182 by the descent of mass 178. The output is connected to a pump 190. Pump 190 operates to pump water from a low level reservoir, chamber 130 to a high level reservoir, chamber 102. Once water is removed from chamber 130, a second direct energy storage mechanism 151 is capable of producing energy. Shown in FIG. 1D, is a fourth phase of operation, in which the direct energy storage mechanism 151 supplies energy output to the indirect energy storage mechanism 171. The phases illustrated (FIGS. 1A-D) can be repeated as often as desired. In some embodiments, sensors can be incorporated to determine fluid level, and provide signals to control systems for automatic operation of any of the direct energy storage mechanisms, e.g., mechanisms 101 and 151, indirect energy storage mechanism 171, pump 190, and a sluice gate 122.

The aggregate energy produced during the three phases of input to, and one phase of output by 171, can be stored for later use. Each additional cycle through the phases can be used to produce larger amounts of potential energy in for example 171 that can be accumulated and released on demand.

Returning to FIG. 1A, during the first phase, the fluid level in chamber 102 is at or near a desired level. Desired level in this example, refers to an operating height achieved by the mass 108 resulting from lift provided by the float 106. Once the desired fluid level in chamber 102, is achieved the sluice gate 122 can be opened. The opening of the sluice gate 122 causes the flow of fluid, for example, water from a high level reservoir, chamber 102, to a low level reservoir, chamber 130. The flow operates a turbine generator 131. The energy generated by operation of turbine 131 can be input into the indirect energy storage mechanism 171. FIG. 1B illustrates the chamber 102 being empty, however, in other embodiments, any method of reducing the level of fluid in chamber 102 can be used to permit descent of mass 108 to generate energy.

In the indirect energy storage mechanism the energy input is converted by converter 172 into rotational force. The rotational force operates to turn a shaft 186A. The shaft 186A is connected to a speed reducer 174. The speed reducer is configured to accept a rotation of shaft 186A and transmit a reduced rotation to shaft 186B. Speed reducer 174 is further configured to provide increased torque to shaft 186B thereby permitting the lifting of mass 178. In one embodiment, given an input rotation at a number of rotations per minute, the speed reducer produces an output rotation having a reduced number of rotations per minute and increased torque. The change in the number of rotations per minute and the increase in torque can be selected based on the parameters of the indirect energy storage mechanism. For example, a desired energy output can be established, which can control selection of a generator 182. The operating parameters for the generator 182 can be used to determine the sizing of mass 178 and an input:ouput ratio needed by speed increaser 180 needed to provide a given rotational speed and torque for the selected generator. According to one embodiment, the speed reducer, 174, is configured to operate at a large input to output ratio. As an example, the speed reducer 174 can be configured to operate to accept rotation of 3000 turns of shaft 186B and provide for 1 turn of output shaft 186C. Other ratios of rotational input to output can be provided. In some embodiments ratios of greater that 100:1 are used.

The rotation of the shaft 186B is transferred to winch 185 through an engaged clutch 175 and a shaft 186C. The clutch 175 is used to engage and disengage the shafts 186B-C depending on a mode of operation. During storage of energy (lift of mass 178) clutch 175 is engaged. A second clutch 179 may be used to engage and disengage energy production components, used during an energy output mode of operation. Operation of winch 185 under the rotation provided by shafts 186B-C in turn winds a cable 176. The winding of cable 176 transfers the rotation of winch 185 into lift of the mass 178 through for example, pulleys 187A-B. Pulleys 187A-B are configured to redirect the force exerted by rotation of winch 185 to achieve lift of mass 178, and are further configured to provide stability during lift of mass 178. A ratchet wheel and lever 184 can be employed to prevent the rotation of the shafts 186B-C. In particular, the ratchet wheel and lever 184 can permit rotation of the shafts 186B-C in one direction (lifting) and prevent an opposite rotation. Shown as an example is a ratchet wheel 184 and lever that permits rotation of shaft 186C to lift mass 178 but prevents rotation in the opposite direction, although other structures and/or mechanisms can be employed to permit rotation while lifting mass 178 and prevent opposed rotation.

As water from the high level reservoir, chamber 102, flows into the low water reservoir, chamber 130, the fluid level in chamber 130 increases. The increase in fluid level lifts a mass 132, of the direct energy storage system 151, by operation of the float 134. The cable 136 is wound around a first winch 138 by rotation of a shaft 148A. The shaft 148A rotates in conjunction with a descent of a counterweight 140. The counterweight 140 is configured to overcome the operating weight of cable 136. When mass 132 is lifted the counterweight 140 descends, and a second winch 144 rotates. The counterweight 140 is connected to the second winch 144 by its own cable 142. The force provided by the descent of the counterweight 140, is redirected using pulleys, 150A-B, and causes the rotation of the second winch 144. The second winch 144 is connected to the first winch 138 through the shaft 148A which rotates with the second winch 144. Rotation of the first winch winds the cable 136 attached to mass 132. Shaft 148A is connected to a clutch 146. Clutch 146 is disengaged during energy storage, lift of mass 132.

During energy discharge clutch 146 can be engaged, connecting mass 132 to a speed increaser 152 which operates a generator 154. The speed increaser 152 is configured to govern a rate of descent of the mass 132. The speed increaser 152 is further configured to accept an input rotation and provide a multiplied output rotation. For example, the speed increaser can be configured to operate to permit a rotation of 1 turn of shaft 148B for every 3000 turns of a shaft 148C. Other ratios of rotational input to output can be provided. In some embodiments ratios of greater that 1:100 are used. Speed increaser 152 is also configured to provide a reduced torque output rotation to the generator 154. The rotation is transmitted to the generator 154 to produce energy. The output of the speed increaser 152 provided to the shaft 148C is configured in conjunction with the operating parameters of the generator 154. For example, a generator can be configured to produce energy optimally at 1,500 rpms and require 737.6 foot-pounds/second to operate, and the speed increaser 152 can be configured to provide an output matching that speed and torque. Additionally, the weight of the mass can be tailored to provide an output through the speed increaser to match a required speed and/or torque. The rotation and/or torque provided by the speed increaser and the operating parameters of the generator 154 can also be tailored to the specific needs of the direct energy storage system. In some examples, generators are selected to produce at least 1000 W, for periods of at least one hour. Additionally, the output provided by the speed increaser 152 (rotation speed and/or torque) can be configured to match the operating characteristics of any generator.

A ratchet wheel and lever can be employed to prevent rotation of the shaft 148A. In particular, the ratchet wheel and lever can permit rotation of the shaft 148A in one direction (during lift of mass 132) and prevent an opposite rotation. The ratchet wheel and the lever 156 permits rotation of shaft 148A during lift of the mass 132, but prevents rotation in the opposite direction while the lever is engaged.

In one example, once the high level reservoir, chamber 102 is empty, the potential energy stored in direct energy storage system 101 can be used to generate energy output. In some embodiments, the fluid level in the chamber, e.g., 102, can be used to control the descent of the mass, e.g., the mass 108. Thus chamber 102 does not need to be empty for energy production. In some embodiments, the fluid level is not used, and mass 108 is released upon chamber 102 having emptied of the fluid (i.e., reached a low level of fluid where some volume can still remain). In some embodiments, the flow of fluid through turbine 131 can be configured to control the descent of mass 108. The flow rate can be tailored to allow the descent of the mass 108 at a rate which matches the operational parameters of the speed increaser 124 and generator 110. The rate of descent of the mass can be configured to provide for an output speed of the speed increaser 124 to produce a desired energy output from the generator 110, and the rate of the descent of the mass can in some embodiments be controlled by the flow rate.

Descent of the mass 108 results in operation of the speed increaser 124 which in turn operates the generator 110. As shown in FIG. 1B, the output from direct energy storage system 101 is provided as input to the indirect energy storage system 171, and the input energy converted into lift of mass 178. In some embodiments, each of the direct energy storage mechanisms 101 and 151 can be linked to respective indirect energy storage mechanisms, e.g., mechanism 171, and the respective output transmitted to a respective indirect energy storage mechanism. Further in other embodiments, having two indirect energy storage mechanisms enables the system 100 to provide for storage and output of energy simultaneously from the indirect energy storage mechanisms. In an alternative, one indirect energy storage mechanism can incorporate multiple masses for storing and releasing energy, enabling a single indirect energy storage mechanism to store and discharge energy at the same time (e.g., FIG. 2B, discussed in greater detail below).

Returning to FIG. 1B, the force provided by the descent of the mass 108, is transmitted through cable 112. Pulleys 126C-D redirect the force of the descending mass 108 causing a first winch 114 to turn. The rotation of the first winch causes shaft 128A to rotate a second winch 118. The second winch winds a cable 117 lifting a counterweight 116. Pulleys 126A-B redirect the force applied by rotation of the second winch, permitting the lifting of the counterweight 116. Shaft 128A is connected to clutch 125. During energy discharge, clutch 125 of the direct energy storage mechanism, is engaged. During energy storage, clutch 125 may be disengaged to permit motion of shaft 128A without operation of the speed increaser 124 and generator 110. With clutch 125 engaged, rotation of shaft 128A causes rotation of a shaft 128B which is connected to the speed increaser 124. The speed increaser is configured to accept an input rotation and provide a reduced torque and/or multiplied output rotation. For example, the speed increaser 124 can be configured to operate to permit a rotation of 1 turn of shaft 128B for every 3000 turns of a shaft 128C. Other ratios of rotational input to output can be provided. In some embodiments, ratios of greater that 1:100 are used. According to some embodiments, speed increaser 124 is configured to govern a rate of descent of mass 108.

The output of the speed increaser is transmitted through the shaft 128C to the generator 110 to produce energy. The output provided is configured in conjunction with the operating parameters of the generator 110. For example, given a generator configured to produce optimally at 1,500 rpms and require 737.6 foot-pounds/second of torque, the speed increaser 124 can be configured to provide a rotational speed output of 1,500 rpms of the shaft 128C and the required torque. The output speed and/or torque provided by the speed increaser can be configured to match the operating parameters of any generator. The generator, speed increaser, and mass can be tailored to the specific needs of the direct energy storage system or the needs for the entire system 100.

In some settings, a desired energy output for the system 100 can be established. The sizing of the masses (e.g., mass 108, 132, and 178) for the indirect and direct energy storage mechanisms (e.g., direct energy storage mechanisms 101, 151 and indirect energy storage mechanism 171) can be selected in conjunction with the operational parameters of the speed increasers (e.g., speed increasers 124, 152, and 180) to provide for operation of the generator and production of the desired energy output. Further, when establishing the desired energy output for system 100, a minimum energy output time can also be established and selection of the masses and speed increasers can be influenced by the total discharge time desired.

In some embodiments, the flow rate of fluid through turbine 131 can also be tailored to achieve a desired rate of descent for a given mass. In some embodiments, the rate at which pump 190 operates to pump fluid can also be tailored to permit a mass to descend at a desired rate. The desired rate of descent of the mass can be configured in conjunction with parameters selected for a generator, mass, and/or speed increaser. In some examples, increasing the weight of the mass can result in an increase in the rotational output speed provided to a generator through a speed increaser. In other examples, reducing the weight of the mass can result in a decrease in the rotational output speed, however, according to one embodiment a minimum weight for the mass must be maintained to overcome the operational resistance of the speed increaser.

Shown in FIG. 1B is the descent of mass 108. According to some embodiments, ratchet wheel and lever 120 must be released to permit the descent of mass 108. According to some embodiments, once the mass 108 stops its descent, energy production by direct energy storage mechanism 101 ceases. Once energy production ceases ratchet wheel and lever 120 can be engaged, and clutch 125 can be disengaged to facilitate lift of mass 108. In some embodiments, the descent of mass 108 can be governed by the fluid level in chamber 102. In one example, a locking mechanism may be employed to prevent the descent of mass 108 (e.g., ratchet wheel and lever 120) can be released and the sluice gate 122 opened lowering the fluid level in chamber 102 permitting the mass 108 to descend. In some examples, the fluid level can be configured to control the descent of the mass 108 without employing a locking mechanism, e.g., ratchet wheel and lever 120. In other examples, fluid level and a locking mechanism can be employed, and in yet others, locking mechanisms can be used without resort to fluid level.

The volume of fluid released and the flow rate of fluid from chamber 102 through, for example the sluice gate 122, can be configured in conjunction with the weight of the mass 108, the input:output ratio provided by the speed increaser 124, and the operational parameters of the generator 110 to produce a desired energy output. The flow of the fluid out of the chamber 102 can be used to control the rate of the descent of mass 108. In some settings, the fluid chamber 102 can be artificially constructed. In other settings, naturally occurring features can be configured to operate as fluid chambers. In some embodiments a given fluid chamber can be air tight. In other embodiments, the fluid chamber can be open to the air.

Shown in FIG. 1C, mass 178 of indirect energy storage mechanism is permitted to descend, resulting in generation of energy through operation of a generator 182 by a speed increaser 180. At least a portion of the output energy produced is directed to a pump 190. Pump 190 is configured to remove water from low level reservoir, chamber 130, and return the water to the high level reservoir 102. Release of the ratchet wheel and lever 184 on indirect energy storage mechanism 171 permits the descent of mass 178. In its energy output mode, clutch 175 of the indirect storage mechanism is disengaged and clutch 179 is engaged. This permits the force generated by the decent of mass 178, to be transmitted through pulleys 187A-B to rotate winch 185. Rotation of winch 185 with clutch 179 engaged transmits the rotation of winch 185 through the shaft 186C to shaft 186D. Shaft 186D is connected to the speed increaser 180. Speed increaser 180 is configured to govern the descent of mass 178 and provide an output rotation to the generator 182 suitable to its operating parameters. Speed increaser 180 is configured to accept an input rotation and provide a reduced torque output rotation. The speed increaser 180 can be configured to operate to permit a rotation of 1 turn of shaft 186D for 3000 turns of a shaft 186E. Other ratios of rotational input to output can be provided. In some embodiments ratios of greater that 1:100 are used. The output rotation is transmitted to the generator 182 to produce energy. The rotational speed and torque provided by the shaft 186E is configured in conjunction with the operating parameters of the generator 180. For example, the generator can be configured to produce energy optimally at 1,500 rpms, and the speed increaser 180 can be configured to provide an output rotation of 1,500 rpms of the shaft 186E. The output provided by the speed increaser can be configured to match the operating parameters of the generator 182. The generator, speed increaser, and/or mass can be tailored to the specific needs of the indirect energy storage system 171 or the needs of the entire system 100. In some embodiments, provided is at least 1000 W of energy output. In some examples, the 1000 W output can be achieved for periods in excess of one hour. Ranges of operation include one hour, 12 hours, one day, days, one week, weeks, one month, months, and even longer periods of time, among other examples. Energy output in ranges of greater than 1000 W is achieved in various embodiments. In some examples, the indirect mechanism is configured to have a storage capacity equal to the energy produced by multiple cycles through the phases shown in FIGS. 1A-D.

Chamber 130 can be emptied by operation of pump 190. The potential energy stored in direct energy storage system 151 can be used to generate energy output. Descent of the mass 132 results in operation of the speed increaser 152 which in turn operates the generator 154. As, shown in FIG. 1D, the output from direct energy storage system 151 is provided as input to the indirect energy storage system 171, and the input energy converted into lift of mass 178. The force provided by the descent of the mass 132, is transmitted through cable 136. Pulleys 150C-D redirect the force of the descending mass 132 causing the first winch 138 to turn. The rotation of the first winch 138 causes shaft 148A to rotate a second winch 144. The second winch 144 winds a cable 142 lifting a counterweight 140. Pulleys 150A-B redirect the force applied by rotation of the second winch, permitting the lifting of the counterweight 140. Shaft 148A is connected to clutch 146. During energy discharge, clutch 146 of the direct energy storage mechanism, is engaged. During energy storage, clutch 146 may be disengaged to permit motion of shaft 148A without operation of the speed increaser 152 and generator 154. With clutch 146 engaged, rotation of shaft 148A causes rotation of a shaft 148B which is connected to the speed increaser 152. The speed increaser 152 controls the descent of mass 132. Further, the speed increaser 152 is configured to accept an input rotation and provide a multiplied and/or reduced torque output rotation. For example, the speed increaser 152 can be configured to operate to permit a rotation of 1 turn of shaft 148B for 3000 turns of a shaft 148C. Other ratios of rotational input to output can be provided. In some embodiments, ratios of greater that 1:100 are used.

The speed increaser output rotation is transmitted through the shaft 148C to the generator 154 to produce energy. The rotational speed provided is configured in conjunction with the operating parameters of the generator 154. According to one embodiment, speed increaser 152 governs the descent of mass 132 and provides the output rotation to the generator 154 suitable to its operating parameters (e.g., speed and torque). For example, the generator can be configured to produce energy optimally at 1,500 rpms, and the speed increaser 152 can be configured to provide 1,500 rpms of the shaft 148C. The output provided from the speed increaser 152 and the operating parameters of the generator 154 can be tailored to the specific needs of the direct energy storage system and/or to the needs of the entire system 100.

Shown in FIG. 1D is an output phase for direct energy storage mechanism 151, during the descent of mass 132. According to some embodiments, ratchet wheel and lever 156 must be released to permit the descent of mass 132. Once mass 132 stops energy production by direct energy storage mechanism 151 ceases. Ratchet wheel and lever 156 can be engaged and clutch 146 can be disengaged to facilitate subsequent lift of mass 132.

Returning to FIG. 1A, the energy system 100 comprises a fluid chamber 102 that is configured to contain fluid 104, typically water. A float 106 is disposed within the fluid chamber 102 so that it floats on the fluid 104. The float 106 supports a mass 108. The presence of fluid 104 in chamber 102, causes the float 106 and the mass 108 to occupy a position of height relative to the bottom of the fluid chamber 102. Stated another way, the float 106 enables the mass 108 to be supported above the bottom of the fluid chamber so that the fluid causes the float and the weight to move up within the fluid chamber as fluid is introduced into the fluid chamber.

Various floatation devices can be employed, and multiple configurations of each can be used to support a mass, e.g., mass 102. In some embodiments, the float 106 can be constructed of buoyant materials that support the mass as a base structure. In some embodiments, buoyant materials can be cast around a given mass. In some settings, buoyant materials can be integrated into the structure of the mass itself. In other embodiments, air chambers can be integrated into a float structure or into the mass itself. In further embodiments, both air chambers and buoyant materials can be used together to define a float 106 for a given mass. Such buoyant materials can include syntactic foam, polymer foams, rigid, semi-rigid, and/or flexible foams as well as other buoyant materials. Multiple floatation devices can be separately constructed and assembled for installation as float 106. Further a variety of known floatation devices can be used to construct a float, e.g., 106, which can support a given mass or be integrated directed into the given mass.

The mass 108 is operatively connected to a generator 110 by a cable 112 wound around a winch 114. A counterweight 116 is configured to wind the cable 112 by rotation of winch 118 during lift of mass 108. As the mass 108 and the float 106 are lifted by an increase in fluid volume in reservoir 102, counterweight 116 falls to rotate the winch 118 through cable 117. Winch 114 rotates with winch 118 and winds cable 112. The ratchet wheel and lever 120 can lock the mass in place so that the potential energy stored by the float 106 and the mass 108 can be stored as fluid levels in the fluid chamber 102 drop. The fluid level within the fluid chamber 102 can be controlled by the sluice gate 122.

In an alternative embodiment, the ratchet wheel and lever may be omitted. Instead, control of the fluid level in the fluid chamber 102 may be used to both generate potential energy and used to act as a brake. The fluid level can be manipulated to prevent the decent of the mass 108 until fluid level decreases. In some embodiments, the fluid level and/or a locking mechanism can control fluid descent of a given mass.

The fluid level within the fluid chamber 102 can be controlled by the gate 122. Thus, the descent of mass 108 may be controlled by the gate 122 instead of by using the ratchet wheel and lever 120. Further the rate of the descent of the mass can be controlled by controlling the rate at which the fluid leaves the chamber. In some examples, by using the fluid level in the fluid chamber 102 alone to control the descent of the mass, instead of the ratchet wheel and lever 120, the longevity of the various components of the direct energy storage device 101 may be increased.

A clutch 125 is configured to engage and disengage connection to a speed increaser 124, which is operatively connected to the generator 110. The combination of the speed increaser and the generator is configured to provide for long periods of energy discharge. In particular, various implementations of the speed increaser 124 and the generator 110 combination can be configured to permit discharge of energy over hours, days, and even weeks according to various embodiments of the present disclosure. The height of the fluid chamber 102, size of the mass 108, diameter of the winch 114, output provided by the speed increaser 124 coupled with the operating parameters of the generator 110 may be adjusted to achieve a desired level of energy output for any given level of energy consumption.

In FIG. 1A, the sluice gate 122 operates to permit flow of fluid from the chamber 102 to another chamber 130. The flow of fluid is used to generate electricity by operating the turbine 131. The output of the turbine 131 can be transferred to an indirect storage mechanism 171, that is further used in the system 100 shown in FIG. 1A. Alternatively, the power output can be fed directly into an energy grid or be consumed by devices in need of the energy. The discharge of fluid (e.g., water) into chamber 130 results in and increase in fluid volume and lift of another mass 132 by another float 134, which is disposed within the chamber 130. As the mass 132 is lifted, a cable 136 is wound around a winch 138 by operation of a counterweight 140 connected to another winch 144 by a cable 142. During lift of mass 132, a clutch 146 of the direct energy storage system 151 is disengaged. This permits rotation of a shaft 148 without operation of a speed increaser 152 and a generator 154. Pulleys 150A, 150B, 150C and 150D operate to change the direction of the forces applied by motion of the mass 132 and the counterweight 140. In one embodiment, the pulleys 150A-D are used with cables 136 and 142. In one example, once the fluid from the fluid chamber 102 is transferred to the fluid chamber 130, the mass 132 is lifted to a maximum height, which can represent a maximum stored potential energy for the direct energy storage device 151.

The indirect energy storage mechanism 171 stores the energy produced as fluid from the fluid chamber 102 flows to the fluid chamber 130. As energy is received by a converter 172, the converter 172 operates the speed reducer 174 to rotate a winch 176 and lift a weight 178. The speed reducer 174 typically is configured to accept even small amounts of energy. According to one embodiment, the speed reducer 174 is configured to operate at similar mechanical ratios as provided by direct energy storage mechanisms 101 and 151. As an example, the speed reducer 174 can be configured to operate with a rotational input to rotational output ratio of 3000:1, although in other embodiments different configurations can employ different ratios. In another embodiment, the indirect energy storage mechanism is configured to accommodate the entire energy output of both direct energy storage mechanisms 101 and 151 and the output of the turbine generator 131. In one example, the indirect energy storage mechanism 171 is configured to accommodate the entire energy output of multiple cycles of the energy output phases illustrated in FIGS. 1A-D. For example, mass 178 can be sized in conjunction with the speed increaser 180 and generator 182 to provide a maximum potential energy equal or greater than the output of multiple phases of energy generation by direct energy storage mechanisms 101 and 151 and/or turbine generator 131.

In operation, as the mass 178 is being lifted, the clutch 175 is engaged and another clutch 179 is disengaged. Once the mass has been lifted, the ratchet wheel and lever 184 prevents descent of the mass. At this point, the indirect storage device 171 is prepared for discharge of stored energy.

In some embodiments, the indirect storage mechanism 171 can be located at a distance to the direct energy storage mechanisms 101 and 151. Having a separate location for indirect storage mechanism 171 can permit configurations with greater operating distances for the mass 178, which in turn can permit greater potential storage. Additionally, different installation locations can also permit larger implementations of the weight 178 and correspondingly larger implementations of the speed increaser 180. As an example, multiple speed increasers 180 could be employed to provide large increases in potential energy storage and large increases in the discharge time, assuming the generator 182 is kept constant. Alternatively, larger installations including increased weight of mass 178 and corresponding increases in output provided by the speed increaser 180 can provide for larger power output. For example, discharge time can be kept constant and power output level increased relative to increases in the sizing of the mass and the speed increaser combination.

For indirect energy storage mechanism, the clutch 179 can be engaged and ratchet wheel and lever 184 released to permit discharge of any stored energy at any desired time. As has been discussed previously, the energy storage mechanisms are readily configured for almost any volume of discharge, including an application specific power level and output time.

Generating greater discharge times for the same energy output becomes a function of appropriately sizing the mass 178 and balancing the input to output ratio provided by the speed increaser(s). As an example, two speed increasers, each providing 1:1000 ratio, can be connected to a weight having a weight of 737,600K lbs. The speed increaser combination controls the descent of the mass and can be configured to provide approximately 11 hours of discharge time with the movement of the mass of two inches. By increasing the range of movement to fifty feet, a discharge time of 3,333 hours may be achieved. The discharge time may be manipulated by configuring the system with different weights and speed increasers.

A high level reservoir, chamber 102, can be sited at a naturally occurring location. A large body of water can be damned, gated or otherwise controlled to perform the function of the high level reservoir. The system 100 can be sited with access to another naturally occurring large body of water that forms the lower level reservoir (e.g., chamber 130 in FIG. 1A). A plurality of turbines may connect the bodies of water. Alternatively, one or both reservoirs can be man-made, taking advantage of one body of water or none. Floats 106 and 134 can be made of any size to accommodate massive weights. An example of a float with great displacement includes modern aircraft carriers which displace approximately 100,000 tons. Other examples include so called "floating cities" and floating oil rigs. Attaching appropriately sized speed increasers to objects having massive displacement and/or buoyancy permits generation of great discharge times with very small movement of the weights. In one embodiment, a floating island could be sized to occupy the entire surface of a naturally occurring body of water. The descent of such massive weight provides the capacity for almost unlimited energy production. The transfer of water from a lake or pond or artificial body of water, in some embodiments may take long periods of time. However, energy system using them can then provide for equally long or longer discharges of usable, clean energy.

Still referring to FIG. 1A, the operation of the system 100, is shown. In FIG. 1B, fluid from fluid chamber 102 has descended to the lower fluid chamber 130 by operation of gravity. The energy produced by the flow of fluid 104 has been stored in the indirect energy storage mechanism 171. As shown, the clutch 125 is engaged and the ratchet wheel 120 is released during energy discharge. The total discharge time is a function of the size of the speed increaser 124, generator 110, sizing of the mass 108, and permitted range of motion, which is constrained by the sizing of the fluid chamber 102. In a preferred embodiment, the system 100 is configured with a discharge time adapted for commercial application. In one setting, a commercially viable discharge of energy is provided within the range of hours of discharge time. In one example, a circulatory apparatus provides for over 12 hours of discharge time from each of the direct energy storage mechanisms, potentially providing for twenty-four hour production of energy during a cycle of the circulatory system 100. In other embodiments, smaller increments of energy are produced by the direct energy storage mechanisms, which are accumulated by indirect energy storage mechanism 171 for discharges of hours, days, weeks and even months. Even small increments of energy can be accumulated in such a system, and over long periods of time, massive potential energy can be accumulated and discharged over a corresponding large period of time. The advantages of such systems are clear when one considers that various unlimited energy sources are often subject to periods of great activity (power generation) and intermittent periods of inactivity. For solar production, for example, no effective sunlight means no energy production. Likewise, for wind farming, no wind means no energy production. By storing produced energy, or at least some of the produced energy, constant energy supplies can be assured. In some implementations, multiple indirect energy storage systems are used in conjunction with one or more direct energy storage systems to provide for constant energy production. In some embodiments, a single direct energy storage system is coupled with a single (indirect system).

As shown in FIG. 1B, once mass 108 completes its descent and the potential energy has been discharged, and, in accordance with some embodiments, the output energy stored in indirect storage mechanism 171, the potential energy generated by lifting weight 132 to the height of chamber 130 can also be released for use and/or storage in indirect energy storage device 171. As shown in FIG. 1B, the mass 132 now occupies its position of greatest height. Ratchet wheel and lever 156 is engaged, for discharge of the energy by system 151 at any time after chamber 130 is empty or substantial so upon release of the lever. Shown in FIG. 1C, a pump 190 operates to drain the chamber 130 and fill the chamber 102. The pump 190 can be operated from the energy stored in the indirect energy storage device 171 or other sources may be employed to power pump 190. As the fluid chamber 102 is filled, the float 106 and the mass 108 are returned to their upper position. When the fluid level falls in the fluid chamber 130, energy can be produced by the direct storage mechanism 151, upon release of a ratchet wheel and lever. As discussed above, the energy discharged from the fall of mass 132 can be stored for later use by the indirect energy storage mechanism 171 and/or portions of the energy produced can be utilized for other applications. The cyclic operation of storage and generation has the potential to produce relatively large supplies of energy as the system 100 cycles through the lifting and descent of the mass 108 and 132. In other embodiments, additional (weights) and direct mass pairs can be combined to provide sourcing of power for indirect storage mechanism 171. Additionally, multiple combinations of the circulatory system 100 can be installed. In some examples, control systems and sensors are configured to permit automatic operation of any direct/indirect energy storage mechanisms. For example, the sluice gate 122 can be operated automatically based on water sensors in chamber 102. Additionally, the clutches of direct/indirect energy storage systems can be automatically engaged or disengaged to permit automated operation.

Figure 2A:
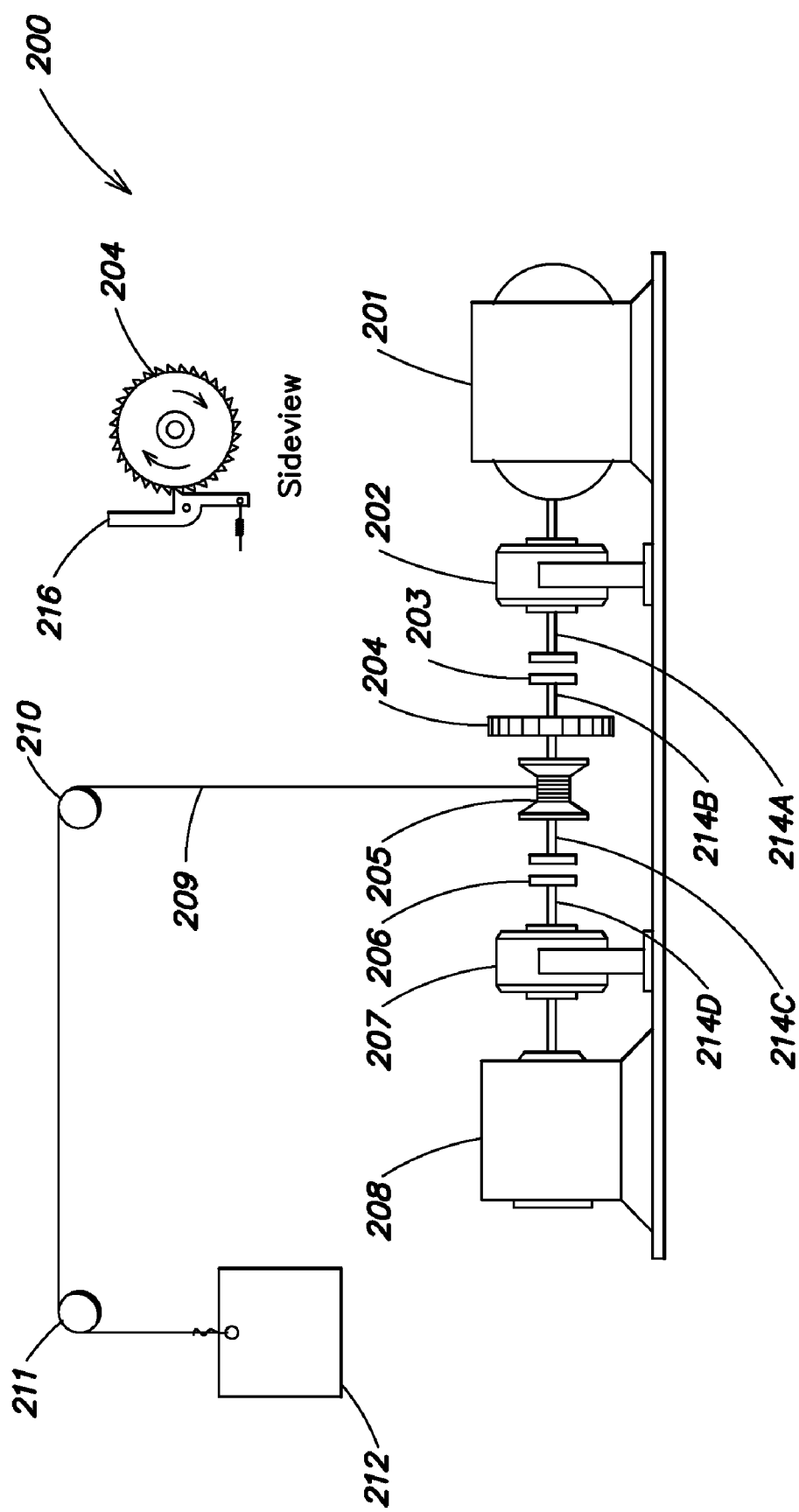
FIG. 2A is a block diagram of an embodiment of an indirect energy storage mechanism according to aspects of the disclosure.
Figure 2B:
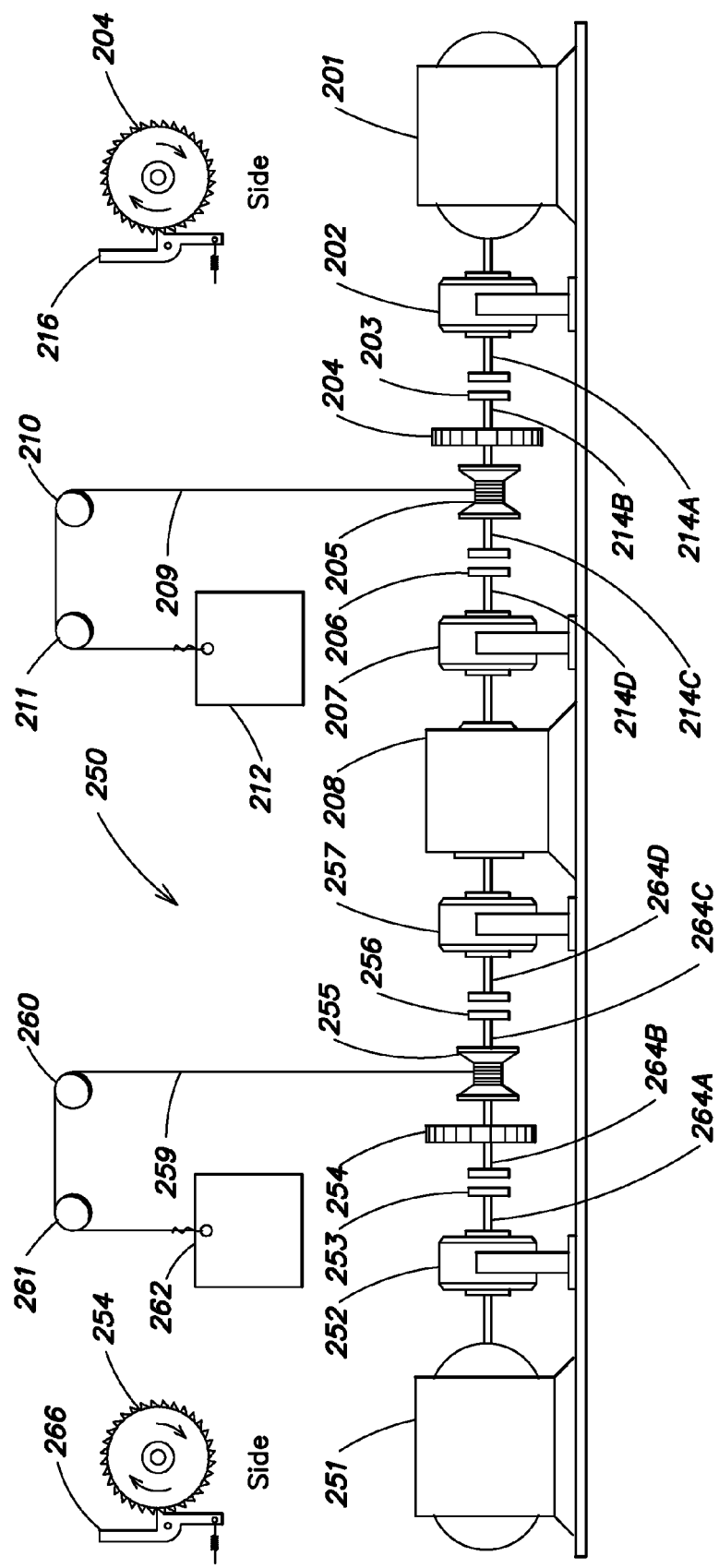
FIG. 2B is a block diagram of an embodiment of an indirect energy storage mechanism according to aspects of the disclosure.

In other embodiments, multiple indirect energy storage mechanisms can be incorporated into system 100. Further, some embodiments can include single indirect energy storage mechanisms with multiple masses for storing and releasing energy. The circulatory stages discussed above with respect to FIGS. 1A-D can be modified to take advantage of multiple indirect energy storage mechanisms and/or indirect energy storage mechanisms with multiple masses. In particular, one indirect energy storage mechanism can provide its output to the pump 190 (filling chamber 102), while the energy output produced by the descent of the mass 132 (shown in FIG. 1D) can be supplied to a second indirect energy storage mechanism. In one alternative, opposed sides of a multiple mass individual energy storage mechanism can be configured for the same operation, e.g., as shown in FIG. 2B.

In some embodiments, the system 100 can be configured to operate in fewer phases than illustrated in FIGS. 1A-1D. In one example, system 100 can include multiple indirect energy storage mechanism (e.g., mechanism 171), and in others, system 100 can include an indirect storage mechanism with multiple masses (e.g., mass 250, FIG. 2B). Using multiple indirect energy storage mechanism or a single indirect energy storage mechanism with multiple masses can enable the combination of the phases shown in FIG. 1A and FIG. 1B into one phase. Similarly, the phases shown in FIGS. 1C and 1D can be combined. Referring to FIG. 1A, for example, mass 108 can be configured to descend upon flow of water through turbine 131. The output of generator 110 can be supplied to an indirect energy storage mechanism (e.g., mechanism 171) and the output of turbine 131 fed to another indirect energy storage mechanism (not shown). In another embodiment, the output of the turbine 131 could be directed to lift a respective mass of a multiple mass indirect energy storage mechanism (e.g., mass 212, FIG. 2B) and the output of generator 110 could be directed to another of the multiple masses (e.g., mass 262, FIG. 2B). The phases illustrated in FIGS. 1C and 1D could likewise be combined. For example one indirect storage mechanism or in another example one of the multiple masses could be permitted to descend generating output power directed to pump 190. In conjunction, a second indirect energy storage mechanism or another one of the multiple masses could be lifted as the flow of water permits the descent of mass 134 and in turn results in energy output from generator 154 to the second indirect energy storage mechanism or the another one of the multiple masses.

Figure 1E:
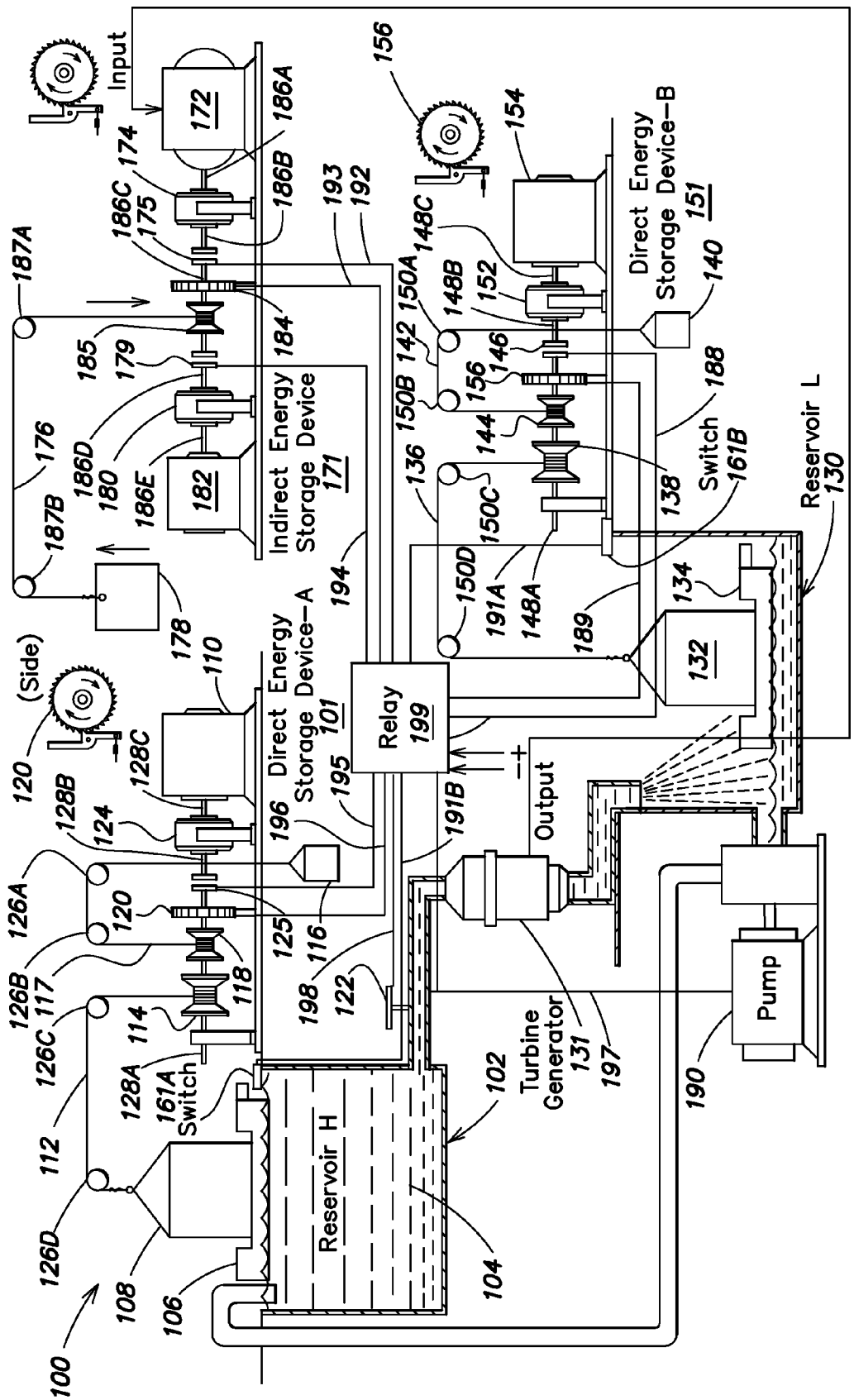

The phases of operation shown in FIGS. 1A-D and as further described herein can be repeated providing for constant energy output. Further, in embodiments where two phases are used (e.g., where phases shown in 1A and 1B occur together and the phases shown in 1C and 1D occur together) constant energy output can be provided over any desired period of time by repeating the phases of operation. Shown in FIG. 1E is an example embodiment of system 100 including a relay 199. Relay 199 is constructed and arranged to provide control signals to components of the system 100 to automatically configure the components during phases of operation. Relay 199 can be configured to control the state of the components to permit transitions between energy storage and energy release. In some embodiments, relay 199 can also be configured to control the flow of fluid within the system. Shown for example in FIG. 1A is system 100 including the sluice gate 122 and pump 190. Shown in FIG. 1E, the sluice gate 122 can be configured to automatically open and close in response to control signals delivered by relay 199 over connection 198. Further, pump 190 can be configured to automatically pump fluid in response to control signals delivered by relay 199 over connection 197. Relay 199 can be configured to manage multiple phases of operation, for example as illustrated in FIG. 1A-D. In some embodiments, relay 199 can be configured to combine the phases shown in FIGS. 1A-D. In one example, the phases illustrated in FIGS. 1A-B can be managed by relay 199 to execute together, and in another example the phases illustrated in FIGS. 1C-D can be managed by relay 199 to execute together.

In one embodiment, relay 199 is connected to components of direct energy storage device 101. The relay 199 can be connected to clutch 125 through connection 195 and to ratchet wheel and lever 120 through connection 196. When energy production is desired from direct energy storage device 101, relay 199 can be configured to engage clutch 125 and disengage ratchet wheel and lever 120 through connections 195 and 196 respectively. Assuming the fluid level in chamber 102 is low enough, mass 108 descends producing energy. In some embodiments, the fluid level in chamber 102 can control the descent of mass 108. Fluid level can be controlled by relay 199 through a connection 198 to the sluice gate 122, which enables relay 199 to automatically open and close the sluice gate 122. Once the sluice gate 122 is open, fluid flows through the sluice gate 122 and turbine 131 and the fluid level in chamber 102 drops. Mass 108 can be configured to descend in response to reduction in fluid level producing energy. In some settings ratchet wheel and lever 120 must be disengaged prior to mass 108 descending. Relay 199 can be configured to release ratchet wheel and lever 120 in conjunction with opening the sluice gate 122.

When energy storage is desired in direct energy storage device 101, relay 199 can be configured to disengage clutch 125 and engage ratchet wheel and lever 120 by delivering control signals to the respective components.

In one embodiment, relay 199 is connected to components of direct energy storage device 151. The relay 199 can be connected to clutch 146 through connection 188 and to ratchet wheel and lever 156 through connection 189. When energy production is desired from direct energy storage device 151, relay 199 can be configured to engage clutch 146 and disengage ratchet wheel and lever 156 through connections 188 and 189 respectively. Assuming the fluid level in chamber 130 is low enough, mass 132 descends producing energy. In some embodiments, the fluid level in chamber 130 can control the descent of mass 132. Fluid level can be controlled by relay 199 through a connection 197 to pump 190, which enables relay 199 to automatically activate and deactivate pump 190. In some examples, activation can occur via supplying power over connection 197 and deactivation by stopping the power supply. Once pump 190 is active, fluid flows out of chamber 130 and the fluid level in chamber 130 drops. Mass 132 can be configured to descend in response to reduction in fluid level producing energy. In some settings ratchet wheel and lever 156 must be disengaged prior to mass 132 descending. Relay 199 can be configured to release ratchet wheel and lever 156 in conjunction with activation of the pump 190. In some examples, release of the ratchet wheel and lever 156 can occur after activation of the pump 190. In other examples, release of the ratchet wheel can be delayed for extended periods of time.

When energy storage is desired in direct energy storage device 151, relay 199 can be configured to disengage clutch 146 and engage ratchet wheel and lever 156 by delivering control signals to the respective components.

In another embodiment, relay 199 is connected to components of indirect energy storage device 171. In one example, the relay can be connected to clutch 179 through connection 194, to clutch 175 through connection 192, and to ratchet wheel and lever 184 through connection 193. When energy production is desired from indirect energy storage device 171, relay 199 can be configured to automatically engage clutch 179, disengage clutch 175, and disengage ratchet wheel and lever 184 using control signals delivered over connections 194, 192, and 193 respectively. Once ratchet wheel and lever 184 are disengages, mass 178 descends producing energy through operation of generator 182.

When energy storage is desired in indirect energy storage device 171, relay 199 can be configured to automatically disengage clutch 179, engage clutch 175, and engage ratchet wheel and lever 184 using control signals delivered over connections 194, 192, and 193 respectively. Upon input of power to converter 172, mass 178 is lifted through transfer of the rotational output of converter 172 through engaged clutch 175, with the lift of mass 172 storing energy in indirect energy storage mechanism 171. Further relay 199 can be configured to control a multiple mass indirect energy storage mechanism (e.g., FIG. 2B). The relay 199 can be configured to automatically control the elements of a multiple mass indirect energy storage mechanism. In one example, each side of a dual mass indirect energy storage mechanism can be independently controlled by relay 199. Relay 199 can be configured to engage and disengage respective clutches connected to each of the dual masses (e.g., clutches 253 and 256 connected to mass 262, FIG. 2B and clutches 206 and 203 connected to mass 212, FIG. 2B) to transition between energy storage and energy generation for each of the dual masses. In one example, engaging clutch 256 and disengaging clutch 253 configures one side of the dual mass indirect energy storage mechanism for energy production. Release of ratchet wheel and lever 254 with clutch 256 engaged transmits the force generated by descent of the mass 262 into the generator 208 producing energy. Conversely disengaging clutch 256 and engaging clutch 253 configures that side for energy storage (typically with ratchet wheel and lever 254 engaged) transforming the rotational output of converter 251 into lift of mass 262.

The second mass of the dual mass indirect energy storage system is configured for energy storage and energy production in a similar manner. Engaging clutch 206 and disengaging clutch 203 configures the opposite half of the dual mass indirect energy storage mechanism for energy production. Release of ratchet wheel and lever 204 with clutch 206 engaged transmits the force generated by descending mass 212 as rotational input to generator 208. With clutch 206 disengaged and clutch 203 engaged the second mass is configured for storing energy by transforming energy input into converter 201 into lift of mass 212. Energy storage typically includes engagement of ratchet wheel and lever 204 to insure the mass 212 does not descend during energy storage.

In yet another embodiment, switches 161A and 161B can be installed in chambers 102 and 130 respectively. Signals from switches 161A and 161B can be received by relay 199 through connections 191A-B. Relay 199 can be configured to transition direct energy storage mechanisms 101 and 151 between energy storage and energy production responsive to signals received from switches 161A-B. In one example, switch 161A can provide a signal that indicates mass 108 has reached a desired height and is ready for energy production. In another example, switch 161B can provide a signal that indicates mass 132 has reached a desired height and is ready for energy production.

In some embodiments, the state of a direct energy storage mechanism transitioned in conjunction with the state of a connected indirect energy storage mechanism. In one example, when energy is produced by the direct energy storage mechanism, the indirect energy storage mechanism is configured to store the produced energy based on automatic configurations made by a relay controlling the direct and indirect energy storage mechanisms. When energy is being stored by the direct energy storage mechanism, the indirect energy storage mechanism can be configured for storage or release of energy as needed. Multiple mass indirect storage mechanisms can be connected to more than one direct energy storage mechanism. Such configurations permit the multiple mass indirect energy storage mechanism to provide for both energy storage and energy production in parallel. In other settings, multiple indirect energy storage mechanisms can be used. The configuration and used of multiple indirect energy storage mechanisms can vary based on location and/or a desired energy output requirement.

Figure 4:
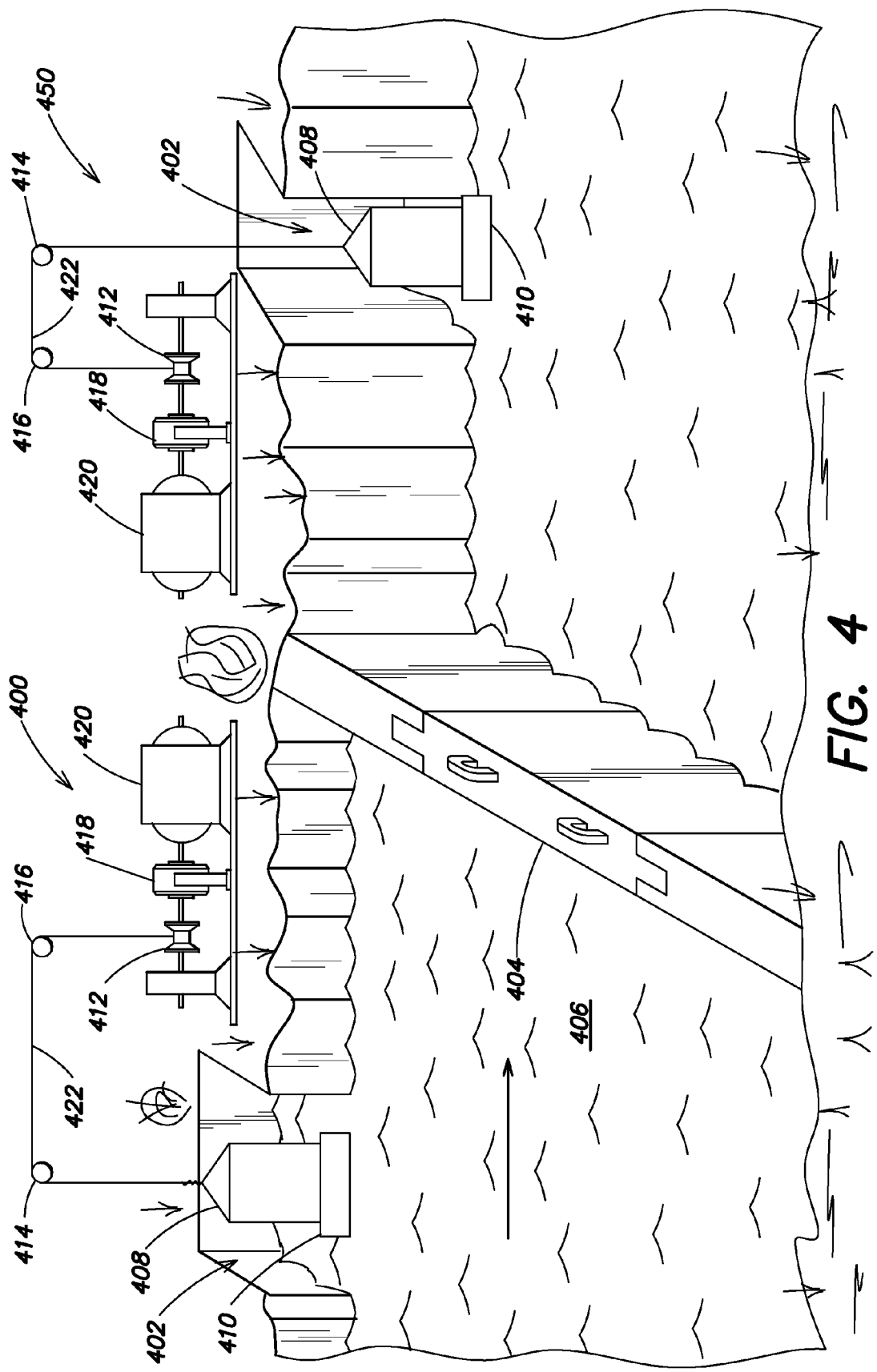
FIG. 4 is a is a block diagram of an embodiment of a direct energy storage mechanism including a water source according to aspects of the disclosure.

Installation sites may vary, for example, a river is readily adaptable for installation of a plurality of direct and indirect energy storage mechanisms. As is discussed in greater detail below, naturally occurring water can be gated to create high water levels from which energy can be extracted. Releasing the water from the gates drops the water level thereby providing for the discharge of stored energy, when a mass lifted by the high water level is permitted to descend, upon release of, for example, a ratchet wheel and lever. Referring to FIG. 4, there is shown an example implementation of the system along a river way including gated damning for increasing water levels in water chambers associated with direct energy storage mechanisms. Alternatively, river ways with geographic features providing for changes in elevation (waterfalls, incline flow, etc.) can provide for variable levels in water that can be employed to generate lift for a direct energy storage mechanism. In some embodiments, water chambers can be located in pairs along the river way, with a first chamber filled by normal flow of the river and a second chamber located at a lower level connected to the first chamber by an outflow. In some examples, the chambers can be excavated from naturally occurring landmasses or constructed along riverbanks. In other examples, a first chamber can be located along a riverbank with a second chamber serving as either a high level or low level chamber depending on the characteristics of the riverbank.

The outflow can include a turbine to generate additional energy between paired direct energy storage mechanisms. Such pairings can provide a similar mechanism as the circulatory system described above with respect to the systems shown in FIGS. 1A-D, with the exception that pump 190 may be omitted for implementations where natural flow of the river way or other water body provides for filling of a high level reservoir.

As shown in FIG. 4, direct energy storage mechanisms are identified at 400 and 450. A water chamber 402 is defined by three sides with the forth side being open to the water body. In some implementations, the water chamber 402 may include a gate (not shown) for closing the water chamber 402, thereby minimizing any time that a water gate 404 needs to fully damn the water body 406 to achieve lift of a mass 408 disposed on a float 410. In some embodiments, such a gate for closing the water chamber can be used instead of the water gate at 404. FIG. 4 illustrates certain features of a direct energy storage mechanism as can be implemented along a water body and does not necessary illustrate all the features of the direct energy storage mechanism. The components of direct energy system 450 mirror the components of system 400 and like references numbers have been used to show the mirrored components. A counterweight adapted for winding a cable 422 around a winch 412 has been omitted from FIG. 4 for purposed of clarity. The cable 422 is attached to the winch 412 and the mass 408 (e.g., weight) and float 410. The cable 422 extends over pulleys 414 and 416 that are adapted to change the direction of the force applied by operation of the mass 408. The water gate 404 can be opened to lower the water level of water body 406. The opening of the water gate 404 and a corresponding drop in water level of the water chamber 402 permits the descent of the mass 408, upon release of a ratchet wheel and lever. Energy is produced as the mass 408 descends in response to releasing, e.g., a ratchet wheel and lever. The winch 412 turns controlled by speed increaser 418, which provides its output to the generator 420 to produce energy. In some embodiments, direct energy systems can include clutches (not shown) for enabling movement of the mass 408 without operation of the generator 420.

Changes in water level can also be accomplished by closing water chamber 402. Drains may be used to reduce a water level in a closed chamber. Additionally water may be pumped from chamber 402 to permit descent of mass 408. Sizing of the mass, winch, speed increaser and generator can vary according to a desired energy output/storage goal. The sizing of the implementation can also vary with the geographic features of the water body. For example, a water body with a naturally occurring large change in elevation could accommodate larger water chambers. Another example is a water body with a large shoreline which could accommodate a greater number of energy storage mechanisms. Additionally, the water body may be used as the source of water for the opening cycle in a circulatory energy generation system (e.g., FIGS. 1A-D) with the subsequent lower water reservoirs being located away from the water body, and either by operation of gravity or by incorporating pump mechanisms subsequent cycles may be performed to provide for storage and output of energy. FIG. 4 shows the installation of direct energy storage mechanisms 400 and 450. According to some embodiments, the energy output achieved is used to supply an indirect energy storage mechanism. In some embodiments, each direct energy storage mechanism can be coupled to an indirect storage mechanism. In some embodiments, a plurality of direct storage mechanisms can be coupled to one indirect storage mechanism. Further according to some embodiments, direct energy storage mechanisms can be connected to a power grid. In some implementations, the direct energy storage mechanisms are configured to store energy for long periods of time. Once the masses are lifted, the potential energy of their lifted mass is configured for almost indefinite storage periods without loss of energy.

Assuming a generator that produces optimally at 1,500 rpms and a winch (e.g., FIG. 1, 114) of a two inch diameter—1500 revolutions per minute produces 1 minute of energy output based on the movement of an attached mass 3000 inches. Given the same generator, a speed increaser that provides an input rotation to output rotation ratio of 1:3000 permits generation of the one minute of energy output based on a mass (e.g., FIG. 1, 108) falling 1 inch. The mass is sized to permit operation of the speed increaser, providing for example the requisite input force to operate the speed increaser. In operation, the speed increaser is configured to control the rate of descent of the mass, permitting consistent energy production by the energy storage system (direct or indirect) during the descent of the mass. The capability of such systems can be extended to provide vast periods of energy discharge in realizable ranges of motion of the attached masses. In some embodiments, varying the size and output of a generator (e.g., FIG. 1, 110) also permits realization of higher levels of energy output and/or greater energy output times. Additionally, altering the sizing of the mass (e.g., mass 108) permits increases in energy output through appropriate sizing of the other elements (e.g., an attached speed increaser) of a direct energy storage device (e.g., 101).

Indirect Storage Mechanism

According to one aspect, it is realized that commercially viable energy generation systems can be achieved that efficiently store energy in any volume. Virtually any source of energy can be augmented with efficient storage to achieve usable ranges of energy output and usable ranges of time of output. Shown in FIG. 2A is an example embodiment of an indirect energy storage mechanism 200. The indirect energy storage mechanism 200 includes a converter 201 for converting different types of energy into mechanical energy stored in the device 200. Different types of energy may require use of a different type of converter (e.g., a motor converts electrical energy to mechanical energy. Combustion engines convert chemical, fossil fuels, or minerals to mechanical energy. Mills convert man power, animal power, or water power to mechanical energy. Turbines convert steam, water potential energy, or wind energy to mechanical energy).

The speed reducer 202 is used to reduce a speed of an input rotation from converter 201 and provide a slower increased torque output rotation. A clutch 203 connects and disconnects a drive shafts 214A-B to transmit force during energy storage (charging) from the speed reducer 202 operated by converter 201. The clutch 203 is connected "on" during storage for charging. The clutch 203 is disconnected "off" during discharge.

The clutch 206 is used to connect and disconnect the drive shafts 214C-D to transmit energy to a speed increaser 207, which operates a generator 208. During release (descent of the mass), the clutch 206 is connected "on," and in some embodiments, during storage (lift of the mass), the clutch is disconnected "off." A ratchet wheel 204 having a ratchet lever 216 is used to hold a mass or weight 212 in place. Other mechanisms can be employed to prevent the drive shaft 214 from rotating under the forces exerted by the mass 212 when energy is stored. According to one embodiment, the ratchet wheel and lever is configured to permit operation of the drive shafts 214B-D for storage of energy, but whenever storage is stopped, the ratchet wheel and lever will lock automatically, thereby preventing discharge of stored energy.

In some embodiments, energy can then be released by disengaging the lever 216. In one example, the lever 216 is disengaged from the ratchet wheel 204 to permit an unwinding motion of a winch 205 that houses a cable 209 attached to the mass 212. In some implementations, the release of lever 216 can be accomplished automatically by control systems (not shown) that are responsive to sensors (not shown) that provide signals regarding the state of system 200. In one example, the control system is responsive to signals from the sensors regarding the height of the mass or other positional information that indicates that mass has achieved a desired height. In another example the rotation of any one of the winches can be monitored and correlated to a position of the mass. The winch 205 also provides for changes in transmission of force generated by turning of the drive shafts 214B-C. Pulleys 210 and 211 further provide for changes in direction of force applied to lift mass 212 by the cable 209. The pulleys 210 and 211 can be operated to support, change direction of force, and guide cable 209. In some embodiments, additional pulleys can be incorporated to provide additional stability and/or support for mass 212. For purposes of clarity, the indirect energy storage mechanism 200 is shown with two pulleys 210, 211.

The speed increaser 207 regulates the speed of the drive shafts 214C-D caused by movement of the mass 212 (e.g., a heavy weight). The speed increaser 207 is sized to achieve an output matching the operative parameters of generator 208 (e.g., speed and torque). The generator 208 is used to convert mechanical energy to electrical energy to perform various tasks. The generator 208 can be used to source power for specific machinery, as a backup energy supply, and/or could be tied directly to a power grid (municipal or otherwise). The sizing and desired output for the generator 208 can vary according to the implementation desired. In an implementation example, the need for consistent energy production can be a controlling factor. By targeting, for example, 1000 W output masses can be lifted to various heights to provide for hours, days and even months of 1000 W energy production. The lifting of the masses can occur over time, in small, slow increments until a desired elevation is achieved for the desired output time.

By chaining multiple indirect energy storage mechanisms together very large power outputs can be consistently generated over prolonged periods of time. The sizing of the various components of the indirect storage mechanism 200 is configurable to almost any identified output level and almost any identified range of discharge time. However, variations in the ratios provided by the speed increaser typically require variation in the sizing (weight) of mass 212. Simply increasing the ratio provided by the speed increaser without adjustment to the mass may likely result in an inoperative mechanism 200. Increases in the ratio provided by the speed increaser 207 typically require increases in the sizing of the mass 212 in order provide sufficient force to operate the increaser generator combination.

The power output of any generator should be sized to be compatible with speed increaser 207 and mass 212. In some embodiments, the a specific generator is selected to provide for a desired power output, and the remaining elements of the system, sized to operate the generator to achieved the desired energy output and any desired output time. The mass (e.g., mass 212) provides potential energy as it is lifted. As the mass 212 is lifted, ratchet wheel 204 and lever 216 can prevent descent of mass 212 automatically. In a locked state, the indirect energy storage mechanism 200 provides for on demand energy output of predetermined power level upon release of lever 216.

Shown in FIG. 2B is another embodiment of an indirect energy storage mechanism 250. For purposes of clarity, similar components have been labeled with like reference numerals. The primary operational difference between indirect energy storage mechanism 200 and 250 is that indirect energy storage mechanism includes two masses 212 and 262. Under this configuration, indirect energy storage mechanism 250 can accept energy and convert the accepted energy into lift of one of the masses, while at the same time outputting energy through the descent of the other mass.

The indirect energy storage mechanism 250 includes mirrored structures 201-212 and 251-262 with both sections interfacing with generator 208. The structures 201-212 operate as discussed above with respect to the indirect energy storage mechanism 200 shown and described in FIG. 2A. The operation and configuration of structures 251-262 is discussed in greater detail below. The indirect energy storage mechanism 250 includes a converter 251 for converting different types of energy into mechanical energy stored in the device 250. Different types of energy may require use of a different type of converter (e.g., a motor that converts electrical energy to mechanical energy). Combustion engines convert chemical, fossil fuels, or minerals to mechanical energy. Mills convert man power, animal power, or water power to mechanical energy. Turbines convert steam, water potential energy, or wind energy to mechanical energy).

Speed reducer 252 is used to reduce a speed of an input rotation from converter 251 and provide a slower increased torque output rotation. Clutch 253 connects and disconnects drive shafts 264A-B to transmit force during energy storage (charging/lifting of mass 262) from the speed reducer 252 operated by converter 251. The clutch 253 is connected "on" during storage for charging (lift of mass 262). The clutch 253 is disconnected "off" during its respective discharge phase.

Clutch 256 is used to connect and disconnect the drive shafts 264C-D to transmit energy to a respective speed increaser 257, which operates the generator 208 when the clutch 256 is engaged. The generator 208 can be configured to accept an input rotation from either speed increaser 207 or 257 and generate energy as an output in response to the provided input. In some embodiments, generator 208 is configured to accept only one input rotation at a time, thus, when clutch 206 is engaged clutch 256 is disengaged to insure that rotations from opposite sides are not transmitted to the generator 208 at the same time. Although in some embodiments, generator 208 can be configured to accept input rotation from both sides at the same time. In some implementations, more than one generator can be employed at 208 to facilitate energy output.

During energy production, the clutch 256 is connected "on," and in some embodiments, during storage, the clutch is disconnected "off." A ratchet wheel 254 having a ratchet lever 266 is used to hold a mass or weight 262 in place. Other mechanisms can be employed to prevent the drive shaft from rotating under the forces exerted by the mass 262 when energy is stored. According to one embodiment, the ratchet wheel and lever is configured to permit operation of the drive shafts 264B-D for storage of energy, but whenever storage is stopped, the ratchet wheel and lever will lock automatically, thereby preventing discharge of stored energy.

In some embodiments, energy can then be released by disengaging the lever 266. In one example, the lever 266 is disengaged from the ratchet wheel 254 to permit an unwinding motion of a winch 255 that houses a cable 259 attached to the mass 252. In some implementations, the release of lever 256 can be accomplished automatically by control systems (not shown) that are responsive to sensors (not shown) that provide signals regarding the state of system 250. In one example, the control system is responsive to signals from the sensors regarding the height of the mass or other positional information that indicates that mass has achieved a desired height. In another example the rotation of any one of the winches can be monitored and correlated to a position of the mass. The winch 255 also provides for changes in transmission of force generated by turning of the drive shafts 254B-C. Pulleys 260 and 261 further provide for changes in direction of force applied to lift mass 262 by the cable 259. The pulleys 260 and 261 can be operated to support, change direction of force, and guide cable 259. In some embodiments, additional pulleys can be incorporated to provide additional stability and/or support for mass 262. For purposes of clarity, the indirect energy storage mechanism 250 is shown with two pulleys 260, 261 for mass 262.

The speed increaser 257 regulates the speed of the drive shafts 264C-D caused by movement of the mass 262 (e.g., a heavy weight). The speed increaser 257 is sized to achieve an output matching the operative parameters of generator 208 (e.g., speed and torque). In one example, the speed increaser is configured to accept and input rotation producing an output rotation of increased speed and reduced torque to the generator 208. The generator 208 is used to convert mechanical energy to electrical energy to perform various tasks. In one embodiment, by chaining multiple indirect energy storage mechanisms together very large power outputs can be consistently generated over prolonged periods of time. The sizing of the various components of the indirect storage mechanism 250 is configurable to almost any identified output level and almost any identified range of discharge time. However, variations in the ratios provided by the speed increaser typically require variation in the sizing (weight) of mass 262. Simply increasing the ratio provided by the speed increaser without adjustment to the mass may likely result in an inoperative mechanism. Increases in the ratio provided by the speed increaser 257 typically require increases in the sizing of the mass 262 in order provide sufficient force to operate the increaser generator combination.

The power output of any generator should be sized to be compatible with speed increaser 257 and mass 262. In dual mass embodiments, different weights can be used for masses 262 and 212, with each connected to a speed increaser (e.g., speed increasers 207 and 257) configured to operate with the respective mass. In some embodiments, a specific generator is selected to provide for a desired power output, and the remaining elements of the system are sized to operate the generator to achieve the desired energy output and any desired output time. In some embodiments, the dual masses 212 and 262 permit consistent and constant energy output by the indirect energy storage mechanism as one half of the indirect energy storage mechanism can always be producing energy. The mass (e.g., masses 212 and 262) provide potential energy as the respective mass is lifted. As the respective mass (212 or 262) is lifted, respective ratchet wheels 204/254 and levers 216/266 can be engaged to prevent the descent of the respective mass 212/262 automatically. In a locked state, the indirect energy storage mechanism 250 provides for on demand energy output of a predetermined power level upon release of either lever 216/266. Multiple mass indirect energy storage mechanisms can be used in conjunction with various energy generation applications, including the circulatory process disclosed in FIGS. 1A-D.

According to one aspect, unlimited energy source production can be connected to an indirect energy storage mechanism to yield a system that provides for consistent power output regardless of constraints on the unlimited energy source. For example, solar energy production can be tied to indirect storage with a portion of the produced energy being diverted to the attached indirect storage device. An appropriately sized indirect energy storage mechanism can provide energy discharge over any period of time where sunlight becomes unavailable.

In one aspect, provided is a system similar to the circulatory and generation system of FIGS. 1A-D, in which energy production cycles are coupled to energy storage cycles. In various embodiments the overall system can produce constant energy over any desired period of time. In particular, a solar and indirect system can provide for twenty-four-hour generation by storing portions of energy produced during daylight hours and discharging stored energy over dark periods, e.g., nighttime. Additionally, variously sized indirect energy mechanisms can be configured for use with such systems. Masses and coupled lifting mechanisms (e.g., a converter and speed reducer combination) can be sized to take days, weeks, months and even years to lift the mass. Similarly sized generation mechanisms (e.g., a generator and speed increaser combination) can produce corresponding discharges over days, weeks, months and even years.

Other energy producing systems may be coupled to indirect storage mechanisms. For example, energy produced by manually lifting weight can be used. Storage elements (weights) can be sized to accommodate the energy expended from physical exertion. In some embodiments, energy storage mechanisms can be configured for portability. For example, the mass can be an appropriately sized chamber. The chamber can be filled by any available material to achieve a mass of sufficient weight. This permits portability of indirect energy storage mechanisms for every day use even in remote locations without readily accessible traditional energy sources (whether limited or unlimited). Such implementations depend on manual exertion as energy input but still provide for usable energy discharge over prolonged periods of time.

In one example, an indirect energy storage mechanism includes the following elements:
- a mass that when lifted enables storage of energy input into the system during charge and causes energy to be produced during descent;
- a speed increaser configured to govern a rate of descent of mass and provided optimal rotation speed and torque to generator during energy output;
- a speed reducer configured to provide necessary torque to lift the mass during storage that includes at least the same mechanical advantage as provided by speed increaser;
- a generator configured to provide a usable energy discharge period; and
- at least one clutch.

Table 1 provides examples of calculations of potential output times. Examples calculations assume a winch circumference of two inches, and generator with an operating requirement of 737.6 foot-pounds/second, and for convenience, approximately 1,500 revolutions per minute to produce energy optimally.

TABLE I

| Mass (Weight) | Speed Increaser (ratio) | Height | Winch Circumference | Discharge Time |
|---|---|---|---|---|
| 73,760 pounds | 1:100 | 30 inches | 2 inches | 1 minute |
| 73,760 pounds | 1:100 | 150 feet | 2 inches | 1 hour |
| 73,760 pounds | 1:100 | 1500 feet | 2 inches | 10 hours |
| 737,760 pounds | 1:1000 | 3 inches | 2 inches | 1 minute |
| 737,760 pounds | 1:1000 | 15 feet | 2 inches | 1 hour |
| 737,760 pounds | 1:1000 | 150 feet | 2 inches | 10 hours |
| 2,213,280 pounds | 1:3000 | 1 inch | 2 inches | 1 minute |
| 2,213,280 pounds | 1:3000 | 5 feet | 2 inches | 1 hour |
| 2,213,280 pounds | 1:3000 | 50 feet | 2 inches | 10 hours |
| 737,600,000 pounds | 2 increasers 1:1000 and 1:1000 | .150 feet | 2 inches | 10 hours |
| 737,600,000 pounds | 2 increasers 1:1000 and 1:1000 | 1.5 feet | 2 inches | 100 hours |
| 737,600,000 pounds | 2 increasers 1:1000 and 1:1000 | 15 feet | 2 inches | 1000 hours |

Direct Energy Storage Mechanism

Figure 3A:
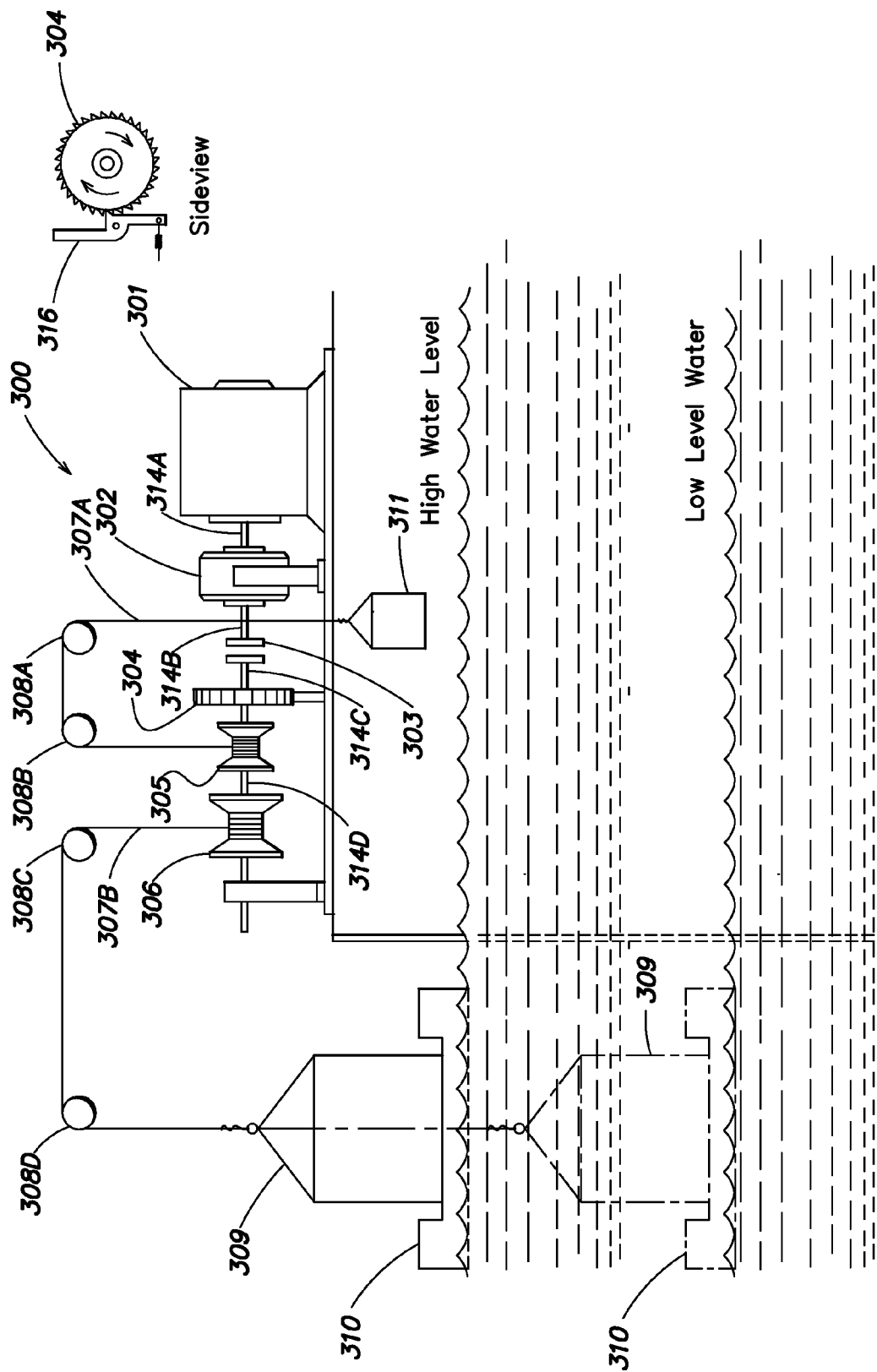
FIG. 3A is a block diagram of a direct energy storage mechanism according to aspects of the disclosure.

In another aspect of the disclosure, direct energy storage mechanisms can be employed to provide for commercially usable discharges of energy. The energy output by the direct energy storage mechanism can be configured to provide for discharges over periods of hours, days, months and even years. FIG. 3A illustrates an implementation of a direct energy storage mechanism 300. Mechanism 300 includes generator 301 for converting mechanical force into electrical energy. Different levels of energy outputs require use of different generators with different operating characteristics. Generator 301 is sized in conjunction with selection of a speed increaser 302 and a mass 309 to provide for a desired output level and/or discharge time.

The speed increaser 302 is used to regulate speed and torque of a drive shaft 314A between the speed increaser 302 and the generator 301, and further regulates the descent of the mass 309. A clutch 303 connects and disconnects drive shafts 314B-C to transmit force during energy discharge and disconnect the drive shaft 314B-C during charging. The clutch 303 is disconnected (turned "off") during storage (charge) and during release (discharge). The clutch 303 is connected (turned "on") to drive operation of the speed increaser 302 and the generator 301.

A ratchet wheel 304 with a ratchet lever 316 may be provided that can be configured to prevent descent of the mass 309. Other mechanisms can be employed to prevent the drive shaft 314C from rotating under the forces exerted by the mass 309 when energy is stored. According to one embodiment, the ratchet wheel 304 and lever 316 is configured to permit operation of the drive shaft 314C for storage of energy (i.e., lift of the mass), but whenever storage is stopped, the ratchet wheel 304 and lever 316 automatically prevents discharge of stored energy (i.e., descent of the mass). In some embodiments, energy can then be released by disengaging the lever 316. In one example, the ratchet lever 316 is disengaged from the ratchet wheel 304 to permit motion. Release of lever 316 can occur automatically, by operation of control systems (not shown). Control systems can also engage and disengaged clutch 303 during operation.

A first winch 306 winds cable 307B during lift the mass 309. The first winch 306 is configured to wind cable 307B in response to the descent of a counter weight 311. The counter weight 311 is connected to a second winch 305 by a cable 307A. Pulleys 308A, 308B, 308C and 308D are configured to provide for changes in direction of force. Elements 308A-D are employed during storage and discharge of energy, and guide the lifting and lowering of the mass 309 and counterweight 311, respectively. Although 308A-D are illustrated as pulleys, one should appreciate that other mechanisms can be employed. Shown in FIG. 3A are a pair of pulleys 308C-D and 308A-B and one cable connecting a first winch 306 and the second winch 305 to a respective weight or mass 311 and 309. Illustrated is one cable and one pair of pulleys. One should readily appreciate that multiple cables strung over multiple pulleys can be used to connect winch to mass. For purposes of clarity, cables 307A-B are illustrated as individual cables and are not intended to be limiting.

The first winch 306 is connected to the mass 309 through cable 307B. In operation, the first winch 306 turns as the mass 309 is lifted by operation of the descent of counterweight 311 on the second winch 305. The counterweight 311 is sized to accommodate the weights of the cables 307A, 307B, and can also be configured to accommodate for resistance in the system due to friction or other similar forces. The cables 307A, 307B can be configured of twisted strand metal cables, chain links or other configurations designed to withstand the stress and strain involved in operation of heavy storage elements (weights). In some implementations, chain links are preferred owing the ability to precisely control ascent and descent of the mass 309, using for example teeth (not shown) in conjunction with winches 306 and/or 305. One should appreciate that additional elements (e.g., pulleys 308A, 308B, 308C and 308D) can be used as needed to support a heavier mass 309 and/or a heavier counterweight 311. For purposes of clarity only two pulleys for each weight are shown in FIG. 3A, although different numbers of each may be employed.

A speed increaser 302 is provided to regulate the speed of the descent of the mass 309. A float 310 and, for example, water level will control the speed of ascent of the mass 309. According to some embodiments, any source of water can be used to provide lift to the mass 309. In some implementations, rain fall can be accumulated in a water chamber (not shown). As the water level increases, the float 310 is configured to lift mass 309 to a desired height. Typically, the stored water is released to produce a low water level. In some examples, this can occur by operation of a pump, which is shown in the examples illustrated in FIGS. 1A-1D, or by operation of a discharge pipe. In other examples, the water chamber may be designed to release the water in other ways. And in yet another example, other systems can used the captured water for other purposes. Once the water level has been reduced, the mass is configured to discharge energy in response to the release of a ratchet wheel and lever until it returns to a rest position.

Additional features can be incorporated into direct energy storage mechanism 300 to provide for increases in water level. For example, rain accumulators may feed water into a water chamber containing the mass 309 and the float 310. In some implementations, any precipitation may be captured and used to fill a water chamber. It is realized that capturing precipitation at height assists in the "lifting" of the mass 309 and the float 310. For example, a rain accumulator that provides a volume of water by operation of gravity requires no additional energy inputs to generate potentially massive energy storage. Rain or snow can serve this purpose, providing a water source without requiring energy input.

Returning to FIG. 3A, the speed increaser 302 is sized to achieve the rotational speed and torque matching the operative parameters of generator 301. Additionally, as the mass 309 cannot descend until release of lever 316 the ability to store the potential energy without loss is almost unlimited. Indeed, a concern in considering the maximum length of storage time becomes limited by the structural integrity of the components of the storage mechanism (e.g., storage mechanism 300). Other implementations may be used to achieve different generator outputs combined with differently sized increaser and masses (weights). Notwithstanding, according to some embodiments, the energy storage mechanism should be configured to provide for discharge time in the range of at least one hour. Other implementations can be configured for discharge times on the order of hours, days, weeks and even years. In some embodiments, a smaller scale operation is desirable, and in conjunction with, for example, manual input discharge time in the range of minutes is better suited to the particular implementation.

As described above, the generator 301 converts mechanical energy to electrical energy to perform various tasks. The generator 301 as discussed above with respect to the indirect energy storage mechanisms can be used to source power for specific machinery, as a backup energy supply, and/or could be tied directly to a power grid (municipal or otherwise). The sizing and desired output for the generator can vary according to the implementation desired. One should realize the sizing of the various components of energy storage mechanism is configurable to any identified output level and any identified range of discharge time. However, variations in the speed increaser, typically require variation in the sizing (weight) of mass. Simply increasing the ratio provided by the speed increaser without adjustment to the mass would likely result in an inoperative mechanism. Increases in the mechanical ratio provided by the speed increaser typically require increases in the sizing of the mass, in order provide sufficient force to operate the increaser.

Figure 3B:
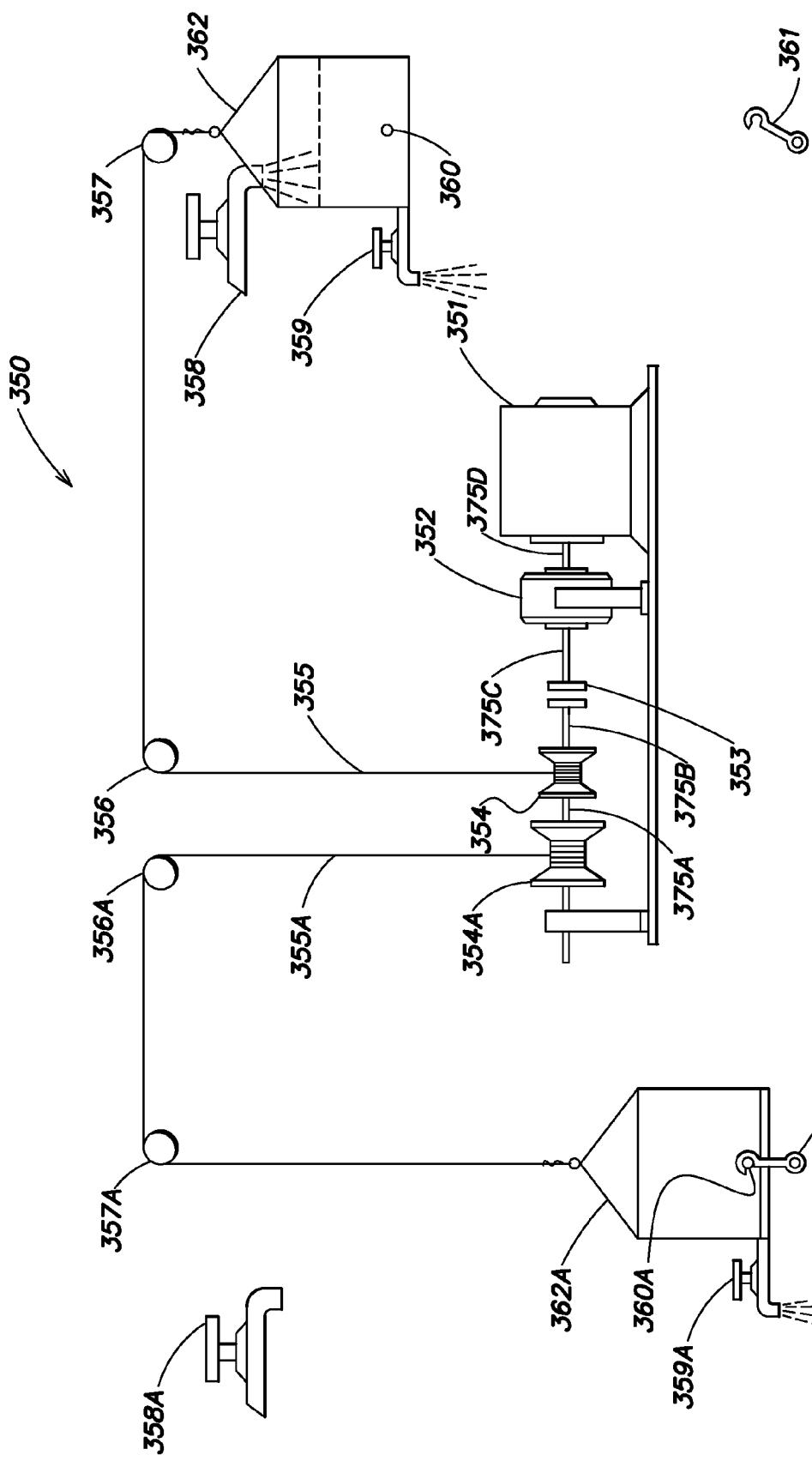
FIG. 3B is a block diagram of an embodiment of a direct energy storage mechanism according to aspects of the disclosure.

Shown in FIG. 3B is another direct energy storage mechanism where energy is supplied in the form of water stored at height. In one embodiment, mechanism 350 is configured to operate within a high rise building. Normal operation of the building provides water stored at height as, for example, drinking water. Other water sources include discharge water necessary to make the building habitable. In one example, these sources of water at height can be captured in a container 362. The container is connected to a first winch 354 by cable 355. Cable 355 is strung through pulleys 356 and 357. The first winch 354 is connected to a shaft 375A and a clutch 353. When clutch 353 is engaged rotation of the first winch is transmitted through the shaft to a speed increaser 352. The speed increaser permits an input rotation and provides a reduced torque output rotation to a generator 351. Various input to output ratios may be provided. In one embodiment the ratio is at least 1:100. A water supply (shown by example at 358 water faucet) is used to fill container 362. Once full, container 362 is permitted to descend. The descent of the container 362 results in an ascent of a second container 362A, through operation of the shaft 375A and the turning of the first winch 354 and a second winch 354A.

The second winch 354A is also connected to shaft 375A. The rotation of winch 354A winds a cable 355A and lifts the second container 362A. Cable 355A is guided and supported by pulleys 357A and 356A, which change the direction of the forces provided to lift the second container 362A. As shown, the second container 362A discharges its payload upon reaching its lowest position. For example, the second container may include a faucet 359A, that when open permits the second container to be drained. System 350 provides for ascent of either one of the first container 362 and second container 362A when they are empty and for descent of either one of the first and second container 362 and 362A when they are full.

The descent of the first container 362 turns the first winch 354 and shaft 375A transmitting the rotation of the first winch 354 to the second winch 354A which lifts the second container 362A. Further the rotation of winch 354 is transmitted to speed increaser 352 through shaft 375B and engaged clutch 353. The speed increaser 352 controls the rate of descent of the containers, and provides its output to generator 351 via a shaft 375D. The generator 351 produces energy based on its operating parameters. In some examples, the operating parameters of the generator are determined based on a desired energy output, and may also be based on a desired energy output time. Once the generator characteristics are determined the remaining elements of the system can be configured to provide the operating parameters required by the generator. For example, the speed increaser 352A can be sized to provide an output matching a required torque and rotational speed of a particular generator. The containers 362 and 362A can be configured to have a loaded weight sized to operate the speed increaser 352.

As shown, a locking mechanism can be employed to hold the containers 362 and 362A in place during storage periods, and during the course of discharge and loading of payloads. For example, devices 360A, 361A, 360, and 361 (hook rod and hook brace pairs) provide an example of a locking mechanism that can be used to hold the containers 362 and 362A in place. The locking mechanisms can be configured to withstand the forces of containers at full weight. Alternatively, controllers (not shown) can be configured to manage the discharge and filling of container 362, 362A so that the opposing weight of the containers assists in preventing motion.

The container 362A can remain full until loading of the mass 362 is complete. When energy production is desired, the load stored in the mass 362A can be released permitting operation of mechanism 350. A discharge 359A is shown by way of example as an outlet and a faucet 359A, however, other discharge mechanisms may be employed. For example, the mass can be configured with a gated bottom (not shown). Upon release of a gate lock, the load contained in mass 362A may be rapidly released, permitting for descent of the mass 362 and corresponding production of energy.

Show in FIG. 3B at 356, 357, 356A and 357A are pulleys configured to guide cables 355 and 355A, and to provide support and change the direction of force applied during ascent and descent of storage elements (weights) 362 and 362A. Pulleys 356, 356A, 357, and 357A are merely examples of devices that can be employed to guide cables 355 and 355A, and to provide support and change direction of the forces applied. Additionally, while the mechanism 350 is shown for purposes of clarity with one cable per container, additional cables may be employed to support operating weight of the containers and their weights, and additional pulleys or other mechanisms can be employed to provide further support and changes in the direction of the forces generated under operation.

Water discharged from the mass 362 may be further utilized to produce and/or store additional energy. An outlet may be connected to a turbine designed to produce energy upon water flow. In one alternative, water discharge may be combined with other direct energy storage mechanisms, for example, as illustrated in FIG. 3A. The water discharge may be used to increase a water level that results in lifting a float/mass combination of another direct energy storage system.

A pair of pipes and faucets 358, 358A are connected to respective supplies of water stored at height. In some embodiments, the supply of water at height can be provided by waste water. In other embodiments, the supply of water at height can be achieved using precipitation accumulators, placed for example on the roofs of buildings. In some implementations, containers 362 and 362A can be configured to take on additional load during descent. Such implementations are particularly suited to building settings, where discharge water may be available on each floor of a building. The speed increaser can be configured to accept variable weight in the containers, e.g., 362 and 362A, and maintain optimal rotational speed for the generator 351 by employing a variable speed increaser. Based on the weight of the mass in operation, e.g., mass 362, the speed increaser 352 provides different rotational ratios (input rotation to output rotation) and transitions between them upon addition or reduction in weight of the container under motion.

In some embodiments, the direct energy storage mechanism 350 can be configured to perform operations like the direct energy storage mechanisms 101 and 151 of FIG. 1A. For example, containers 362 and 362A can also be configured with floats (not shown) for operation in fluid chambers (not shown). Further, direct energy storage mechanism 350 can be connected to one or more indirect energy storage mechanisms (e.g., indirect energy storage mechanisms 200 and/or 250). Further multiple direct energy storage mechanisms (e.g., 101, 151, 300, and 350) can supply energy to one or more indirect energy storage mechanisms (e.g., 171, 200, and 250).

Table II provides examples of calculations of potential output times. Examples calculations assume a winch of two inches, a generator with an operating requirement of 737.6 foot-pounds/second, and for convenience, approximately 1,500 revolutions per minute to produce energy optimally.

TABLE II

| Mass (Weight) | Speed Increaser (ratio) | Height | Winch Circumference | Discharge Time |
|---|---|---|---|---|
| 73,760 pounds | 1:100 | 30 inches | 2 inches | 1 minute |
| 73,760 pounds | 1:100 | 150 feet | 2 inches | 1 hour |
| 73,760 pounds | 1:100 | 1500 feet | 2 inches | 10 hours |
| 737,760 pounds | 1:1000 | 3 inches | 2 inches | 1 minute |
| 737,600 pounds | 1:1000 | 15 feet | 2 inches | 1 hour |
| 737,600 pounds | 1:1000 | 150 feet | 2 inches | 10 hours |
| 2,212,800 pounds | 1:3000 | 1 inch | 2 inches | 1 minute |
| 2,212,800 pounds | 1:3000 | 5 feet | 2 inches | 1 hour |
| 2,212,800 pounds | 1:3000 | 50 feet | 2 inches | 10 hours |
| 737,600,000 pounds | 2 increasers 1:1000 and 1:1000 | .150 feet | 2 inches | 10 hours |
| 737,600,000 pounds | 2 increasers 1:1000 and 1:1000 | 1.5 feet | 2 inches | 100 hours |
| 737,600,000 pounds | 2 increasers 1:1000 and 1:1000 | 15 feet | 2 inches | 1000 hours |

Discharge Time

Figure 5:
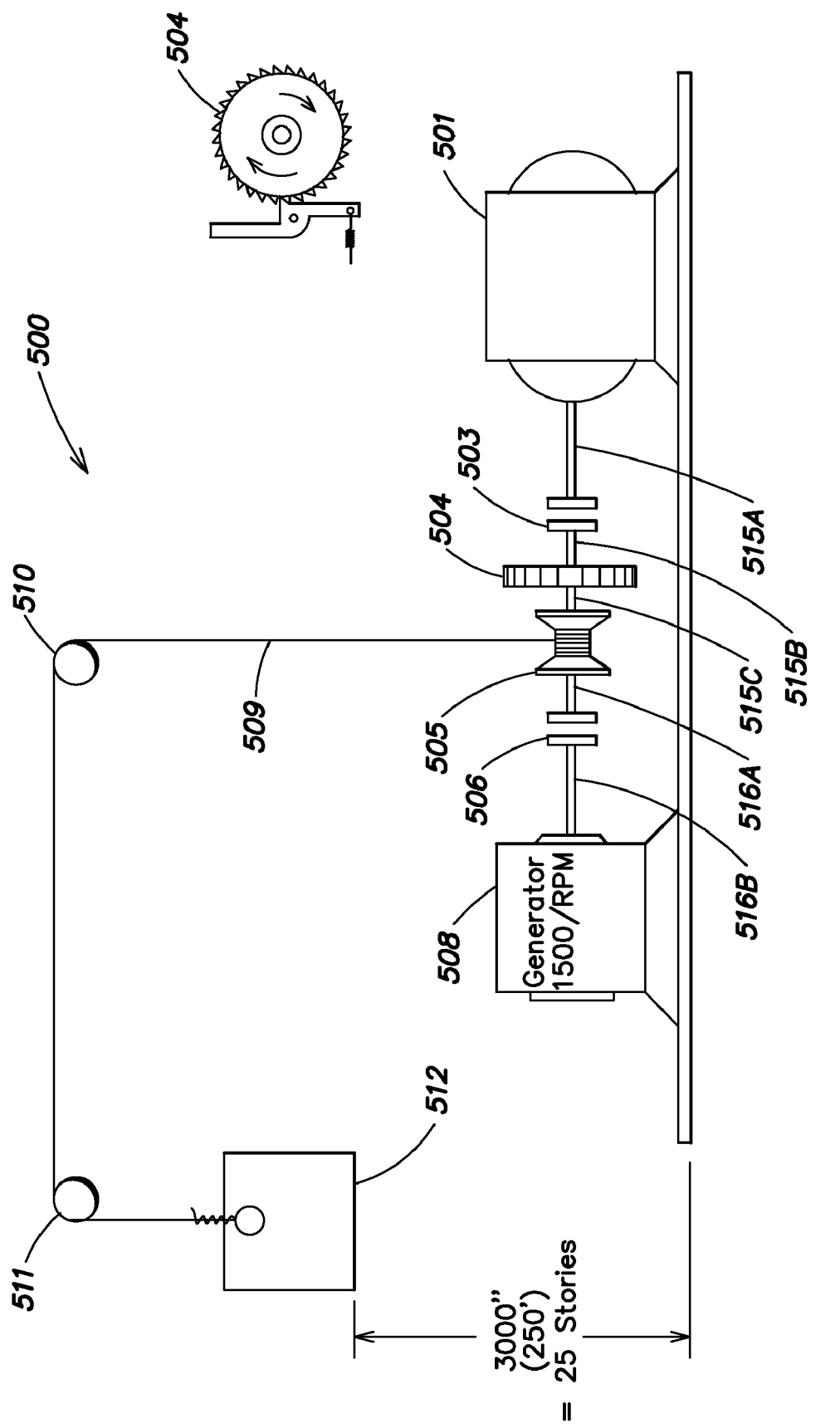
FIG. 5 is a block diagram of a prior art implementation of an energy storage device.

According to one aspect, long period discharge times are achievable regardless of the energy source (limited, unlimited, direct energy storage mechanisms, etc) using well known principles concerning objects at height representing potential energy in conjunction with rigid control mechanisms for governing the speed of descent of the object at height. Shown for example in FIG. 5 is an example implementation of the traditional models of the interplay between kinetic and potential energy. Shown in FIG. 5 is a converter 501 for lifting an object of given weight to a predetermined height or within a given range of operating height. In this example, a mass 512 is assumed to be 737.6 lbs. A cable 509, which travels through pulleys 510, 511, links the mass 512 to a generator 508 (assuming an operating speed of 1500 rpms). The cable 509 is wound around a winch 505 (e.g., assuming a winch having a two-inch circumference). This configuration permits generation of electric power. However, one should readily appreciate the limitations imposed on such a system as shown in 500. During charge a converter 501 accepts input energy and transforms it into rotational force on a shaft 515A. Shaft 515A is connected to a first clutch 503. When charging the first clutch 503 is engaged. The first clutch is connected to shafts 515B-C and a winch 505. The rotation of 515A is transmitted to the winch 505 through the shafts 515B-C. The rotation of the winch 505 lifts mass 512. The winch 512 is connected to the mass 512 by a cable 509 wound through pulleys 510-511.

Once energy production is desired, the mass 512 is released from a height (e.g., 3000 inches), the first clutch 503 is disengaged, and a second clutch 506 is engaged for energy generation. The second clutch 506 transmits the force generated by descent of the mass 512 to a generator 508. Rotation of the winch 505 causes rotation of shaft 516A. The shaft 516A is connected to the second clutch 506 and the second clutch is connected to a shaft 516B. When engaged the second clutch transmits the rotation of the shaft 516A to the shaft 516B. The shaft 516B is connected to the generator 508. Thus the rotation of the second winch operates the generator 508. Based on the operating characteristic of 1,500 revolutions per minute for the generator 508, the longest period of time for output that can be achieved, as shown, is one minute.

Figure 6:
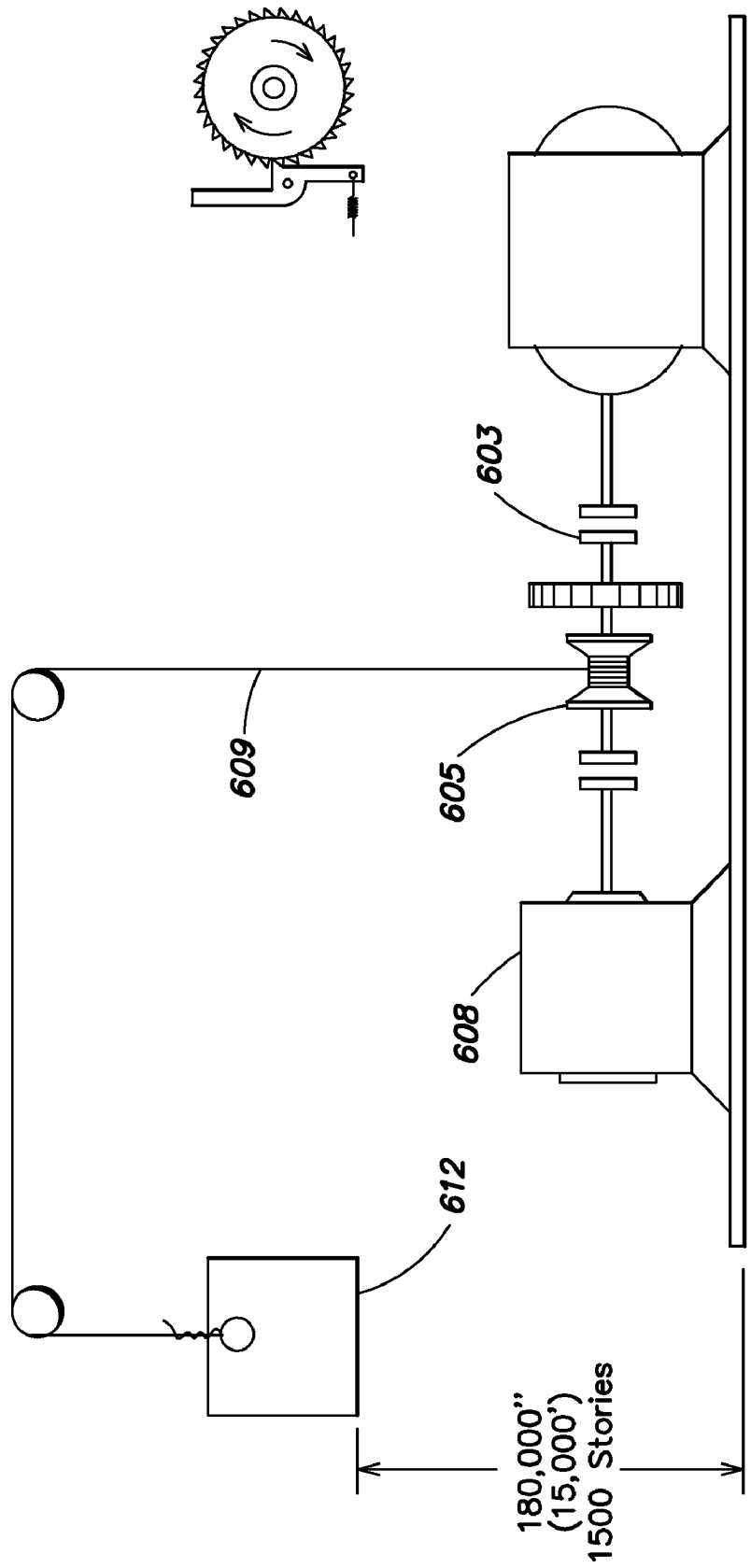
FIG. 6 is a block diagram of a prior art implementation of an energy storage device.

For the example provided, to provide for one minute of duration, the object 512 must be lifted to at least 250 feet or twenty-five stories. This is assuming, of course, a winch of circumference two inches. Winches of greater circumference would necessarily require greater distance to even provide the possibility of one minute of discharge. Thus, an issue with providing for longer periods of discharge is presented by physical limitations on the distance a weight can be lifted. In FIG. 6, the height required to lift a similar object 612 to provide one hour of energy output by a generator 608 that operates at 1500 rpms is illustrated to be approximately 15,000 feet. A solution of lifting objects higher in order to achieve usable discharge times for an energy storage mechanism is simply not feasible. As FIG. 6 illustrates, even with a winch 605 of only two inches in circumference, the object 612 would need to be positioned at a height of 180,000" (15,000') in order to achieve one hour of discharge time. The constraints imposed by the real-world prevent application of the principals of lift and drop in such a simple fashion. Likely, one would not even be able to implement this example, as the ability to provide for a cable 609 of 15,000 feet that would not alter the circumference of the winch 605 beyond operational parameters is highly questionable. Indeed the highest structure in the world—stands at a little over 2600 feet.

Understanding that viable energy storage mechanisms need to account for limited ranges of motion results in a redesign of such systems to provide for storage elements (masses) of significant sizing coupled to speed increasers of large ratios in order to balance the needs of power output in physically realizable ranges of height, and the need to provide long discharge times.

Figure 7:
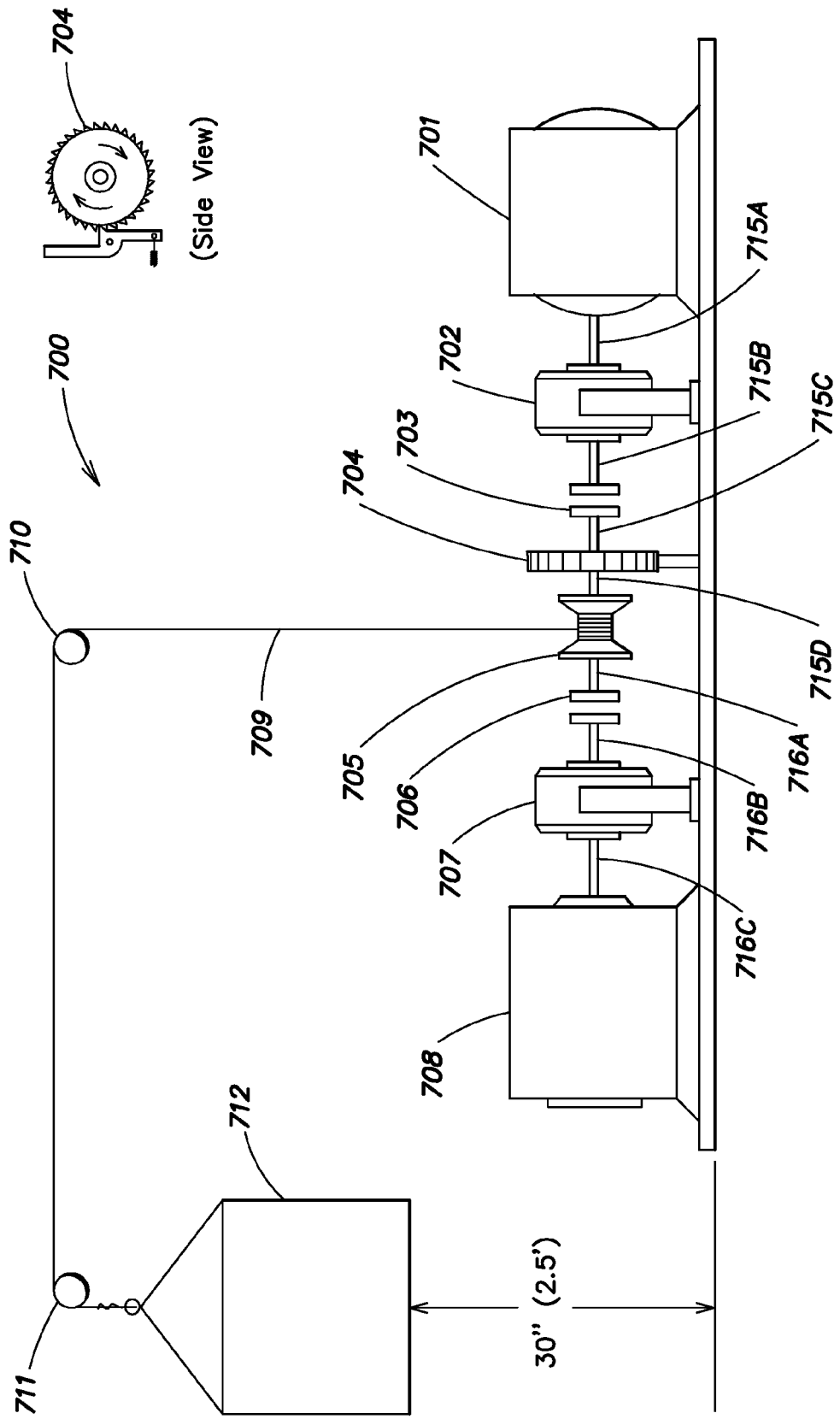
FIG. 7 is a functional block diagram of an embodiment of an indirect energy storage device according to aspects of the disclosure.
Figure 8:
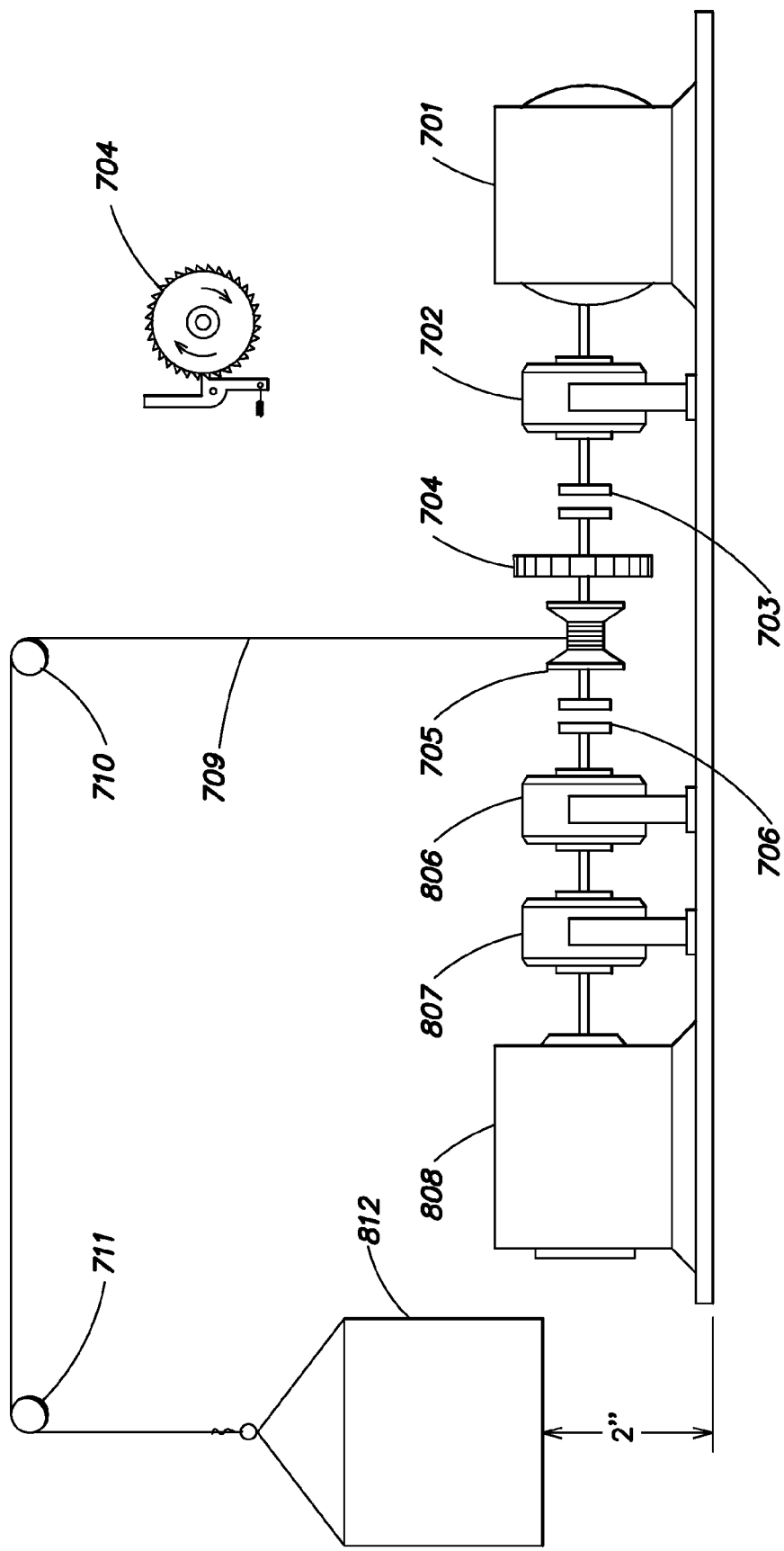
FIG. 8 is a functional block diagram of an embodiment of an indirect energy storage mechanism according to aspects of the disclosure.

To extend the assumptions presented in FIGS. 5 and 6, examples of indirect energy storage mechanisms with similar operational parameters are shown in FIGS. 7 and 8. A winch 705 is assumed to be the same circumference (i.e., two inches), and a generator 708 is assumed to have the same operating characteristics (i.e., optimal production at approximately 1,500 rpms). As shown a converter 701 is connected to a speed reducer 702 and a first clutch 703. When the first clutch 703 is engaged power input into converter 701 results in rotation of a shaft 715A. Rotation of the shaft 715A provides an input to speed reducer 702. The speed reducer 702 is configured to accept an input rotation and provide a reduced speed, increased torque output rotation to a shaft 715B. In some examples, the speed reducer is configured to provide a ratio of 100:1 in others 1000:1 and in yet others 3000:1, although in other embodiments different configurations can employ different ratios. The shaft 715B transmits the rotation through the engaged first clutch 703 to a shaft 715C and 715D. A ratchet wheel and lever 704 can be employed to prevent a counter rotation of shafts 715C and 715D. The rotation of the shafts 715C-D turns winch 705 lifting mass 712. Winch 705 is connected to mass 712 by cable 709. Cable 709 is guided and supported by pulleys 710 and 711.

Once energy production is desired, the mass 712 is released from a height (e.g., 30 inches), the first clutch 703 is disengaged, and a second clutch 706 is engaged for energy generation. The force produced by the descent of mass 712 is redirected by pulleys 710-711 and turns the winch 705. The winch 705 is connected to a shaft 716A. The Shaft 716A is connected to the second clutch 706. The second clutch 706 is connected to a shaft 716B which is connected to the speed increaser 707. The rotation of the winch in transmitted through the shafts 716A-B and the engaged second clutch 706 to the speed increaser 707. The speed increaser 707 is configured to control the descent of mass 712 and provide a reduced torque output through a shaft 716C. The output is configured to match the operating requirements of a generator 708. In some examples, the speed increaser is configured to provide a 1:100 ratio, in others, a 1:1000 ratio and in yet others 1:3000. Different ratios can be provided. In some settings, the operating parameters of the generator can control the ratio used.

The rotation of winch 705 is transmitted to a speed increaser 707 through the shafts 716A-B and the engaged clutch 706. The speed increaser 707 provides the multiplied speed and/or reduced torque output to the generator 708 through the shaft 716C. Implementing speed increasers in series permits realization of large discharge times. Shown in FIG. 8, for example, is a speed increasers at 806 coupled to a second speed increaser at 807 (each for example can be configured to provide an operational ratio of 1:1000) connected to a mass 812 (weight e.g., 737,600K lbs). 100 hours of discharge can be realized based on a movement of the weight (e.g., mass 812) by approximately two inches. Such configurations can be extended to lifting a similarly sized mass to a height of fifty feet to achieve an overall discharge time of 30,000 hours. Hypothetically these systems have nearly unlimited potential to store and discharge energy.

Storage Element (Mass)

Various configurations of the mass, the speed increaser and the generator combinations are contemplated for use in conjunction with the energy storage and generation mechanism/systems disclosed herein (direct, indirect, circulatory, integrated, hand operated, etc.). This disclosure should not be read to limit the implementation of any mass to a particular system or mechanism. Rather, it should be understood that the various examples provided are intended to have components that may be used together, as substitutes, and in various combinations.

In one embodiment, masses of large weight can be implemented using existing structures. For example buildings (high rises, skyscrapers, etc.) can be used as masses in energy storage and/or generation systems. Both indirect and direct storage mechanisms benefit from the use of massive weights. The use of a mass of large weight permits storage and discharge of large energy output over long times with very small movement of the respective mass. In some implementations, the small movements are performed over correspondingly large periods of time (discharge times of years are permitted for masses (weights) of sufficient weight) making the small movement negligible from the perspective of building occupants. Other massive structures can be used or constructed for use in conjunction with energy storage and generation system while providing for other purposes. In some implementations, it will take as long to lift the mass as the time to descend. In these implementations, the lift of buildings can occur over periods of months and even years, again making the movement imperceptible during both charge and discharge. Other implementations contemplate use of floating cities and structures located therein, which by their very nature contemplate some perceptible movement of the structures that make up the environment. One should also appreciate that much smaller implementations are also contemplated.

In some examples, masses may include empty chambers that are filled as needed. In other examples, indirect and/or direct storage mechanism can be designed for portability, and the mass filled with whatever objects are available at the site of installation. Dirt, stone, and/or water are readily available materials that can be used to fill a chamber of a mass to provide operational weight. In other embodiments, objects of any given weight can be found at height. It is realized that high-rise buildings comprise a source of water at height under normal operating conditions. Capturing the water at height permits direct energy production from the potential energy these objects represent.

In yet other embodiments, discussed further below, manually operated energy systems can be implemented to take advantage of objects of weight located near installations. Again dirt, stone, and/or water (as examples) may provide the necessary weight to permit operation of a direct or indirect energy system. Typically, such implementations involve the use of smaller scale (smaller weight) masses rather than the large masses (weights), some of which are discussed in detail, above. It should be realized that both massive and smaller sized masses can be used in any energy storage implementation, depending on a desired energy output level and a desired output time. The ability to size the components to fit the various power needs permits wide variability in implementation. Additionally, coupling direct and indirect system provides for integrated power storage and generation. Integrated storage and generation increases the ability to configured energy systems to the desired output and desired time of discharge.

Manual Operation Devices

According to another aspect of the disclosure, energy storage systems can use and store any available energy source to provide for usable discharges of energy. In one implementation, a mass can be used in combination with a hand operated winch to lift the mass to height. A manually operated winch is typically configured to be useable in a household environment, where overall power consumption is relatively small compared to implementations that are connected to a municipal power grid, for example. In the household setting, the masses are typically found in the range of tens of tons of weigh, although larger and/or smaller masses can be implemented in various embodiments.

Figure 9:
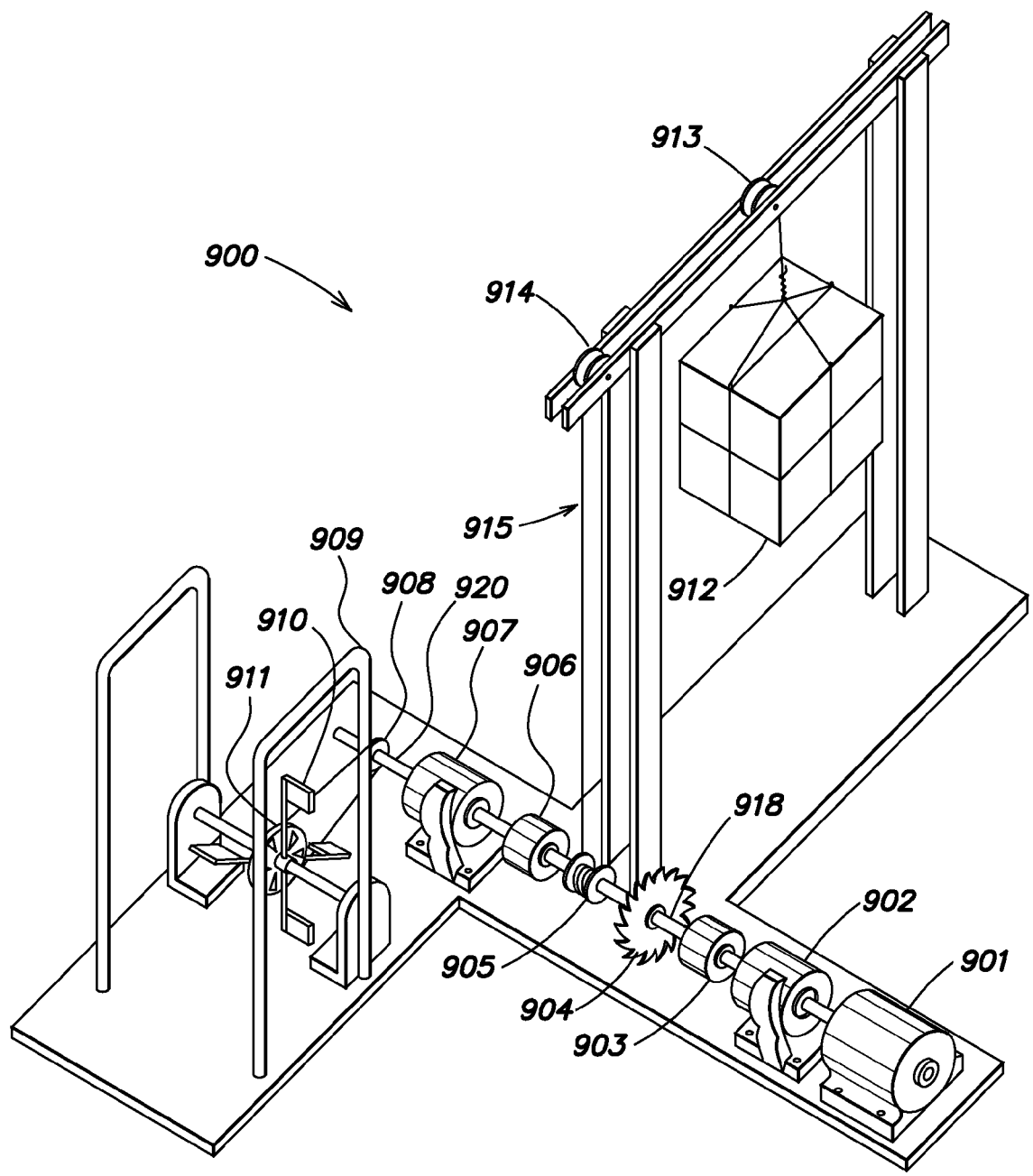
FIG. 9 is a functional block diagram of an embodiment of an indirect energy storage mechanism, according to aspects of the disclosure.

An example of a hand operated indirect energy storage mechanism 900 is shown in FIG. 9. A generator 901 is sized appropriately for a household setting (as little as a 100 W generator can be effectively employed). In one example, a 220 W generator is used to match typical household consumption.

The generator 901 is connected to a speed increaser 902, which is configured to provide optimal rotational speed and torque to the generator 901 based on descent of a mass 912. The speed increaser 902 is further configured to govern the speed of descent of the mass 912 by its operation. A clutch 903 provides for connection between the speed increaser 902 and mass 912 during energy discharge. The clutch 903 disconnects the mass 912 and the speed increaser 902 during energy storage. A ratchet wheel and lever 904 insures that a shaft 918 does not rotate and release stored energy until a discharge is desired. A winch 905 connects the shaft 918 to the mass 912 by a cable 915. The cable 915 can be made of any cable, chain, wire, twisted strand cable, or even in some implementations rope or synthetic fiber capable of supporting the weight of the mass 912. Different arrangement of the structures supporting the mass 912 can be used to distribute the weight across various cables, tethers, or the like to enable different materials to be employed as the cable 915. The cable 915 is wound through pulleys 913-914 and attached to the mass 912. For convenience, attachment is illustrated as four points surrounding the mass 912, which are attached to a single point of the cable 915. One should readily appreciate that different attachment configurations can be used. Another example could include a bore through the center of the mass 912 and attachment below the mass through plating specially adapted to insure integrity of the attachment. Various other structures can be employed in attaching masses for use with winch and/or speed increaser generator combinations.

Still referring to FIG. 9, the clutch 905 engages a manual winch 911 through a speed reducer 907. The speed reducer 907 reduces the input motion to provide an slower increased torque output rotation. The provided torque is configured to be sufficient to lift mass 912 by operation of the winch 905. A drive chain sprocket and chain 908 connects the manual winch 911 to a shaft 920. Under operation, the shaft 920 is connected to the speed reducer 907, which turns the winch 915 and lifts mass 912. The manual winch 911 can be configured to operate by hand. In some implementations, the manual winch 911 includes a structure to permit operation by physical movement caused by the motion produced by a user's legs. Shown for purposes of clarity shown is an example in which the manual winch 911 is operated by rotation, although other implementations can employ vertical movement and/or longitudinal forces applied by a user. Multiple hand powered cranks 911 can be employed to provide additional lift. In some embodiments, additional lift can be configured to achieve height in a shorter period of time, is some embodiments a plurality of cranks can be employed to lift heavier weight.

Figure 10:
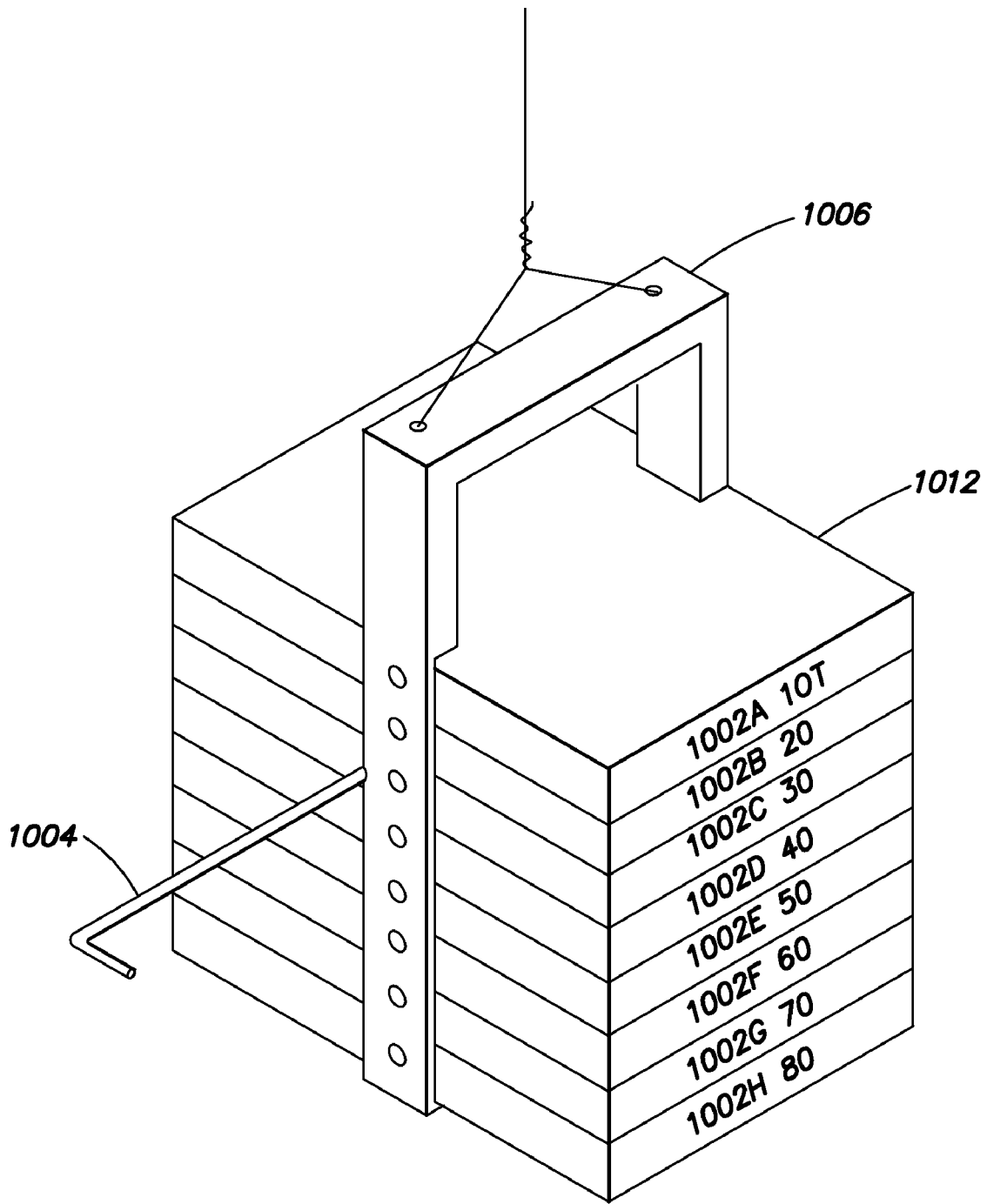
FIG. 10 is an embodiment of a configurable weight mass used to store potential energy according to aspects of the disclosure.

Some implementations provide for variable ratio speed increasers 902. With a variable speed increaser, different weights can be employed to provide for greater discharge times or higher energy output. Although in a typical implementation, increased discharge time is used. Shown in FIG. 10 is an example of a variable weight mass 1012. Only the basic elements of the variable weight mass are shown for the purposes of clarity. At 1002A components of predetermined weight are configured for use with a locking mechanism. The locking mechanism can comprise, for example, a pin 1004 and a yoke 1006, although other locking mechanisms can be employed. According to one embodiment, each component 1002A is configured for optimal operation with one hand crank. In one example, operation of one hand crank lifts a single storage component 1002A to height within a desired period of time, providing for a corresponding or longer discharge during descent. The operating parameters of the generator 901 provide a desired output level and time based upon the descent of the weight and the control provided by the speed increaser 902.

In one embodiment, the addition of users allows for lifting of larger a mass. For example, multiple manual winches (e.g., FIG. 9, 911) may be connected to a drive shaft (e.g., FIG. 9, 920). Each additional manual winch increases the force provided to lift the mass 1012. In some embodiments, multiple manual winches can be connected to produce the lifting force for a variable weight mass 1012. Each of the manual winches can also be configured to engage and disengage the drive shaft that transmits the lifting force. The weight for mass 1012 is set based upon each engaged manual winch. For example, a first component 1002A is lifted when one manual winch is engaged and operated. In another example, a first 1002A and second 1002B component lifted when two manual winches are attached and operated. In yet another example components 1002A-H are lifted when eight manual winches are engaged and operated. It other examples, additional components (e.g., 1002A-H) can be used in conjunction with additional manual winches. In some embodiments, the manually winches themselves can be configured to provide greater lifting force by addition of greater input (through for example additional operators). In another embodiment, the ratio of hand cranks to storage components can be varied. In some examples, additional users and hand cranks can be employed to increase the speed at which the mass is lifted to height.

According to another aspect, household implementations can take advantage of direct energy storage. Households with natural water supplies, wells, aquifers, ponds or other sources of water, for instance, can be employed in conjunction with direct energy storage systems to provide for efficient energy storage and output. A direct energy system can be implemented in a household setting using well water as a source of water that lifts a mass in a water chamber by operation of a float. The water could be supplied by input of energy by a user, for example, in conjunction with a hand operated pump. In one alternative, a pump could supply the water to lift a mass.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

We claim:

1. An energy storage system configured to accumulate energy for discharge, the energy storage system comprising:
    an indirect energy storage assembly configured to accept energy input, the indirect energy storage assembly comprising:
        a converter configured to provide an output rotation upon input of energy from an energy source,
        a first gear mechanism coupled to the converter, wherein the first gear mechanism has a first gear ratio to accept an input rotation from the converter and provide a reduced output rotation,
        a first clutch coupled to the first gear mechanism and to a first winching arrangement, wherein the first winching arrangement translates rotational motion of the first gear mechanism into a linear motion,
        a first mass coupled to the first gear mechanism via a first pulley assembly and the first winching arrangement,

37 wherein the first mass is configured to accept the translated linear motion and generate potential energy over a period of time when the first mass is raised using the reduced output rotation of the first gear mechanism, and a second gear mechanism coupled to a first generator and coupled to the first winching arrangement via a second clutch, wherein the first mass upon descent is configured to provide an input rotation to the second gear mechanism, wherein the second gear mechanism has a second gear ratio to accept the input rotation and produce an output rotation, wherein the first generator is configured to produce energy in response to the output rotation provided by the second gear mechanism, and wherein neither the first clutch nor the second clutch are engaged simultaneously; and at least one direct energy storage assembly configured to produce energy input into the indirect storage assembly, the direct storage assembly comprising:

a second mass, a third gear mechanism coupled to the second mass via a second pulley assembly, a second winching arrangement and a third clutch, wherein the second mass upon descent is configured to provide an input rotation to the third gear mechanism, and wherein the third gear mechanism has a third gear ratio and is configured to produce from the input rotation a reduced torque output rotation, and a second generator coupled to the third gear mechanism, wherein the second generator is configured to produce energy input into the indirect storage assembly in response to the reduced torque output rotation provided by the third gear mechanism.

2. The energy storage system of claim 1, wherein the first gear mechanism is further configured to provide the reduced rotation output at a ratio of at least one hundred to one.

3. The energy storage system of claim 1, wherein the first gear mechanism is further configured to increase a torque of the reduced rotation output relative to the input rotation.

4. The energy storage system of claim 1, wherein the second gear mechanism of the indirect energy storage assembly is further configured to provide an input to output ratio of at least one to one hundred.

5. The energy storage system of claim 1, wherein the first mass of the indirect energy storage assembly is configured to have a maximum height and at least the second gear mechanism of the indirect energy storage system is configured to control a rate of descent of the first mass to achieve a total descent time.

6. The energy storage system of claim 5, wherein the total descent time is at least one hour.

7. The energy storage system of claim 1, wherein at least the second gear mechanism and the first generator of the indirect energy storage assembly are configured to control the rate of descent.

8. The energy storage system of claim 1, wherein the indirect energy storage assembly further comprises a locking mechanism configured to prevent the first mass from descending while engaged, and wherein the locking mechanism is further configured to permit lift of the first mass by the reduced rotation output of the first gear mechanism when engaged.

9. The energy storage system of claim 1, wherein the third gear mechanism of the direct energy storage assembly is further configured to provide an input to output ratio of at least one to one hundred.

38

10. The energy storage system of claim 9, wherein the second mass of the direct energy storage assembly is configured to have a maximum height and at least the third gear mechanism of the direct energy storage system is configured to control a rate of descent of the mass to achieve a total descent time.

11. The energy storage system of claim 10, wherein the total descent time is at least one hour.

12. The energy storage system of claim 1, wherein the direct energy storage assembly further comprises:

a means for lifting the second mass, wherein the means is configured to lift the second mass to a raised position with high potential energy from an at rest position with little or no potential energy.

13. The energy storage system of claim 12, wherein the at least one direct energy storage assembly further comprises a fluid chamber.

14. The energy storage system of claim 13, wherein the fluid chamber is configured to provide a fluid level to the means for lifting, and the means for lifting is further configured to lift the second mass in response to increases in the fluid level.

15. The energy storage system of claim 14, wherein the second mass of the direct energy storage assembly is configured to have a maximum potential energy at a predetermined fluid level in the fluid chamber and is configured to discharge potential energy as fluid level in the fluid chamber lowers.

16. The energy storage system of claim 14, further comprising an outlet configured to permit discharge of fluid from the fluid chamber.

17. The energy storage system of claim 16, wherein the outlet is connected to at least one of a second direct storage assembly and a turbine configured to produce energy to input to the indirect energy storage assembly.

18. The energy storage system of claim 13, further comprising a natural source of fluid.

19. The energy storage system of claim 18, wherein the natural source of fluid includes at least one of a pond, river, lake, estuary, tidal body of water, runoff, flood water, and precipitation.

20. The energy storage system of claim 1, wherein the direct energy storage assembly further comprises a locking mechanism configured to prevent the second mass from descending while engaged, and wherein the locking mechanism is further configured to permit lift of the second mass when engaged.

21. An indirect energy storage system configured to accept energy input, the indirect energy storage assembly comprising:

a converter configured to provide an output rotation upon input of energy from an energy source;

a first gear mechanism coupled to the converter, wherein the first gear mechanism has a first gear ratio to accept an input rotation from the converter and provide a reduced rotation output, said first ratio being at least one hundred to one;

a first clutch coupled to the first gear mechanism and to a first winching arrangement, wherein the first winching arrangement translates rotational motion of the first gear mechanism into a linear motion;

a mass coupled to the first gear mechanism via one or more pulley mechanisms and the first winching arrangement, wherein the mass is configured to accept the translated linear motion and generate potential energy over a period of time when the mass is raised by the reduced rotation output of the first gear mechanism; and a second gear mechanism coupled to a generator and coupled to the first winching arrangement via a second clutch, wherein the mass upon descent is configured to provide an input rotation to the second gear mechanism and wherein the second gear mechanism has a gear ratio of at least one to one hundred to accept the input rotation and produce an output rotation, wherein the generator is configured to produce energy in response to the output rotation provided by the second gear mechanism, and wherein neither the first clutch nor the second clutch are engaged simultaneously.

22. The indirect energy storage system of claim 21, wherein the first gear mechanism is further configured to increase a torque of the reduced rotation output relative to the input rotation.

23. The indirect energy storage system of claim 21, wherein the mass is configured to have a maximum height and at least the second gear mechanism is configured to control a rate of descent of the mass.

24. The indirect energy storage system of claim 21, wherein the system produces energy only in response to descent of the mass.

25. An energy storage system configured to accumulate energy for discharge, the energy storage system comprising:
an indirect energy storage assembly configured to accept energy input, the indirect energy storage assembly comprising:
a converter configured to provide an output rotation upon input of energy from an energy source,
a first gear mechanism coupled to the converter, the first gear mechanism having a first gear ratio to accept an input rotation from the converter and provide a large output torque,
a first clutch coupled to the first gear mechanism and to a first winching arrangement, the first clutch adaptable to receive an input from a first relay to disengage the first gear mechanism from the first winching arrangement, wherein the first winching arrangement translates rotational motion of the first gear mechanism into a linear motion,
a first mass coupled to the first winching arrangement via a first pulley assembly, the first mass accepting the translated linear motion and being configured to efficiently generate potential energy over a period of time when the first mass is raised by the large output torque of the first gear mechanism, and
a second gear mechanism coupled to a first generator and coupled to the first winching arrangement via a second clutch, wherein the first mass upon descent is configured to provide an input rotation to the second gear mechanism, wherein the second gear mechanism has a second gear ratio to accept the input rotation and produce an output rotation, wherein the first generator is configured to produce energy in response to the output rotation provided by the second gear mechanism, and
wherein neither the first clutch nor the second clutch are engaged simultaneously;
a first direct energy storage assembly configured to produce energy input into the indirect storage assembly, the first direct storage assembly comprising:
a second mass,
a second winching arrangement coupled to the second mass, the second winching arrangement accepting a linear motion of the second mass and translating the linear motion into a rotational motion,
a third clutch coupled to the second winching arrangement and to a third gear mechanism, the third clutch adaptable to receive an input from a second relay and to disengage the third gear mechanism from the second winching arrangement, wherein the third gear mechanism is configured to accept an input rotation from the translated linear movement of the second mass, and wherein the third gear mechanism produces a reduced torque output rotation from the input rotation, and
a second generator coupled to the third gear mechanism, wherein the second generator is configured to produce energy input into the indirect storage assembly in response to the reduced torque output rotation provided by the third gear mechanism; and
a second direct energy storage assembly configured to produce energy input into the indirect storage assembly, the second direct storage assembly comprising:
a third mass,
a third winching arrangement coupled to the third mass, the third winching arrangement accepting a linear motion of the third mass and translating the linear motion into a rotational motion,
a fourth clutch coupled to the third winching arrangement and to a fourth gear mechanism, the fourth clutch adaptable to receive an input from a third relay and to disengage the fourth gear mechanism from the third winching arrangement, wherein the fourth gear mechanism is configured to accept an input rotation from the translated linear movement of the third mass, and wherein the fourth gear mechanism produces a reduced torque output rotation from the input rotation, and
a third generator coupled to the fourth gear mechanism, wherein the third generator is configured to produce energy input into the indirect storage assembly in response to the reduced torque output rotation provided by the fourth gear mechanism.

26. The energy storage system of claim 25 wherein the first, second, and third relays are selected from the group comprising a manually operable relay and an automatic relay.

27. The energy storage system of claim 26, wherein the first direct energy storage assembly further comprises:
a means for lifting the second mass disposed in a first fluid chamber,
wherein the means for lifting the second mass is configured to lift the second mass to a raised position with high potential energy from an at rest position with little or no potential energy, and
wherein the second mass of the first direct energy storage assembly is configured to have a maximum potential energy at a predetermined fluid level in the first fluid chamber and is configured to discharge potential energy as fluid level in the first fluid chamber lowers.

28. The energy storage system of claim 27 wherein the second direct energy storage assembly further comprises:
a means for lifting the third mass disposed in a second fluid chamber,
wherein the means for lifting the third mass is configured to lift the third mass to a raised position with high potential energy from an at rest position with little or no potential energy,
wherein the third mass of the second direct energy storage assembly is configured to have a maximum potential energy at a predetermined fluid level in the second fluid chamber and is configured to discharge potential energy as fluid level in the second fluid chamber lowers, and wherein the fluid level in the second fluid chamber is conversely dependent on the fluid level in the first fluid chamber.

29. The energy storage system of claim 27 further comprising a natural source of fluid selected from the group consisting of a pond, river, lake, estuary, tidal body of water, runoff, flood water, and precipitation.

30. The energy storage system of claim 26, wherein the second mass of the first direct energy storage assembly is configured to have a maximum height and at least the third gear mechanism of the first direct energy storage system is configured to control a rate of descent of the second mass to achieve a total descent time.

* * * * *